United States Patent
Nelson et al.

(10) Patent No.: US 11,617,061 B2
(45) Date of Patent: Mar. 28, 2023

(54) PRIVATE CELLULAR NETWORK FOR ACQUISITION AND EXCHANGE OF LOCATION DATA WITH EMERGENCY CALL CENTERS

(71) Applicant: Geoverse LLC, Bellevue, WA (US)

(72) Inventors: Roderick Nelson, Bellevue, WA (US); Daniel Person, Little Elm, TX (US); Jason V. Smith, Castle Rock, CO (US)

(73) Assignee: Geoverse LLC, Bellevue, WA (US)

( * ) Notice: Subject to any disclaimer, the term of this patent is extended or adjusted under 35 U.S.C. 154(b) by 0 days.

(21) Appl. No.: 17/462,948

(22) Filed: Aug. 31, 2021

(65) Prior Publication Data

US 2022/0070623 A1    Mar. 3, 2022

Related U.S. Application Data

(60) Provisional application No. 63/072,739, filed on Aug. 31, 2020.

(51) Int. Cl.
*H04W 4/029*    (2018.01)
*H04W 4/90*    (2018.01)

(52) U.S. Cl.
CPC .............. *H04W 4/029* (2018.02); *H04W 4/90* (2018.02)

(58) Field of Classification Search
CPC ................................ H04W 4/029; H04W 4/90
USPC ...................................................... 455/404.2
See application file for complete search history.

(56) References Cited

U.S. PATENT DOCUMENTS

| | | |
|---|---|---|
| 2007/0010245 A1 | 1/2007 | Levitan |
| 2008/0220801 A1* | 9/2008 | Hobby ................. H04M 3/5116 455/521 |
| 2009/0041206 A1* | 2/2009 | Hobby .................... H04W 4/90 455/404.1 |
| 2010/0049744 A1 | 2/2010 | Zhao |
| 2012/0088468 A1 | 4/2012 | Dickinson et al. |

OTHER PUBLICATIONS

PCT Application No. PCT/US2021/048468 International Search Report and Written Opinion dated Dec. 1, 2021.

* cited by examiner

*Primary Examiner* — Ted M Wang
(74) *Attorney, Agent, or Firm* — Polsinelli LLP

(57) ABSTRACT

The present disclosure is directed to acquisition and exchange of location data with an emergency call center using a private cellular network. A private cellular network includes a location engine configured to store specific location information of user equipment connected to the private cellular network via an access point; and at least one network element configured to receive a request for placing an emergency call from an endpoint communicatively coupled to the private cellular network; determine endpoint specific location information for the endpoint by communicating with the location engine of the private cellular network that identifies location of the endpoint within a confined space in which the private cellular network is deployed; and send the endpoint specific location information of the endpoint to an emergency service provider for dispatching to a location of the endpoint based at least in part on the endpoint specific location information.

19 Claims, 10 Drawing Sheets

PRIVATE CELLULAR NETWORK FOR ACQUISITION AND EXCHANGE OF LOCATION DATA WITH EMERGENCY CALL CENTERS

CROSS-REFERENCE TO RELATED APPLICATIONS

This application claims priority to U.S. Provisional Patent Application No. 63/072,739, filed on Aug. 31, 2020 and titled "PRIVATE CELLULAR NETWORK FOR ACQUISITION AND EXCHANGE OF LOCATION DATA WITH EMERGENCY CALL CENTERS," the entire content of which is incorporated herein by reference.

BACKGROUND

Field of the Disclosure

The present disclosure relates to operation of a private cellular network and more specifically to use of a private cellular network to acquire detailed location information to be exchanged with an emergency call center for addressing underlying emergency incidents faster and more efficiently.

Description of the Related Art

Various generations of wireless technologies and supporting networks have been designed, standardized, implemented and used globally to service millions/billions of end users. These wireless networks have evolved from analog to digital radio access systems, from circuit switching to packet core, from proprietary mobility and administrative protocols to standardized protocols, and from single provider to multi provider networks.

Wireless connectivity through cellular networks provides several advantages over wireless connectivity through Wi-Fi, such as faster speed, security and longer coverage range to name a few. As wireless technologies evolve and connectivity capabilities of mobile devices and Internet of Things (IoT) devices increase, many established and large cellular wireless service providers (mobile network operators) are unable to meet the increased demand. Use of private cellular networks in areas and locations where providing wireless services are impossible or economically not feasible for the larger cellular wireless service providers, can address the gap to meet the increased demand.

SUMMARY

One or more example embodiments of inventive concepts are directed to using private cellular networks and the infrastructure thereof to obtain more accurate location information associated with a request for emergency services and communicating the same with an emergency call center. Such a request may be made via an endpoint connected to a private cellular network within a confined geographical space. In one example, the use of a private cellular network in a confined space can allow for more accurate determination of the location of an emergency incident within the confined space and communication of the same to an emergency call center. Providing the emergency call center with detailed information on the location of the incident inside the confined space (compared to information on approximate location of the confined space currently provided to emergency call centers) can allow an emergency service provider to reach the incident location faster to attend to the underlying emergency situation potentially eliminating or reducing human and financial costs of the emergency incident.

a private cellular network includes a location engine configured to store thereon one or more database that include specific location information of one or more user equipment connected to the private cellular network via a corresponding access point associated with the private cellular network; and at least one network element configured to receive a request for placing an emergency call from an endpoint communicatively coupled to the private cellular network; determine endpoint specific location information for the endpoint by communicating with the location engine of the private cellular network, the endpoint specific location information identifying location of the endpoint within a confined space in which the private cellular network is deployed; and send the endpoint specific location information of the endpoint to an emergency service provider, the emergency service provider identifying which response team to dispatch to a location of the endpoint based at least in part on the endpoint specific location information.

In another aspect, the endpoint specific location information corresponds to an access point of the private cellular network to which the endpoint is communicatively coupled.

In another aspect, the endpoint specific location information identifies at least one of a building, a floor of the building and a room number inside the building in which the endpoint is located.

In another aspect, the endpoint specific location information identifies a latitude, a longitude, and a height above ground of the location of the endpoint within the confined space.

In another aspect, the location engine includes a first database and a second database, the first database including location information of each access point associated with the private cellular network, the second database including information on association between one or more access points of the private cellular network and one or more users connected to the one or more access points.

In another aspect, the first database is populated at least in part using cell location data collected by a platform node associated with the private cellular network.

In another aspect, the cell location data are collected from at least one of an external cell database that includes information on location of access points and a spectrum allocation server (SAS) database.

In another aspect, the second database is populated every time an edge core router of the private cellular network records a connection log that identifies a UE in association with an access point.

In another aspect, the location engine is queries by one of a mobility management entity (MME) of an evolved packet core of the private cellular network or a component of an emergency network.

In another aspect, the location engine is queried via an application programming interface (API) call to a programmatic interface of the location engine.

In one aspect, a system includes a private cellular network communicatively coupled to an emergency service provider, the private cellular network having a location engine configured to store thereon one or more database that include specific location information of one or more user equipment connected to the private cellular network via a corresponding access point associated with the private cellular network, the specific location information identifying a location of a corresponding user equipment within a confined space in which the private cellular network is deployed, the specific location information, when provided to an emergency service provider enables the emergency service provider to specifically locate the corresponding user equipment within the confined space and provide requested emergency response to a user of the corresponding user equipment. The system also includes at least one network element configured to determine endpoint specific location information for an endpoint from which an emergency call request is received, the endpoint specific location information being determined by communicating with the location engine of the private cellular network; and send the endpoint specific location information of the endpoint to the emergency service provider.

In another aspect, the endpoint specific location information corresponds to an access point of the private cellular network to which the endpoint is communicatively coupled.

In another aspect, the endpoint specific location information identifies at least one of a building, a floor of the building and a room number inside the building in which the endpoint is located.

In another aspect, the endpoint specific location information identifies a latitude, a longitude, and a height above ground of the location of the endpoint within the confined space.

In another aspect, the location engine includes a first database and a second database, the first database including location information of each access point associated with the private cellular network, the second database including information on association between one or more access points of the private cellular network and one or more users connected to the one or more access points.

In another aspect, the first database is populated at least in part using cell location data collected by a platform node associated with the private cellular network.

In another aspect, the cell location data are collected from at least one of an external cell database that includes information on location of access points and a spectrum allocation server (SAS) database.

In another aspect, the second database is populated every time an edge core router of the private cellular network records a connection log that identifies a UE in association with an access point.

In another aspect, emergency call request is received at an edge core router of the private cellular network, and the at least one network element is one of a mobility management entity (MME) of an evolved packet core of the private cellular network or a component of an emergency network.

In another aspect, the location engine is queried via an application programming interface (API) call to a programmatic interface of the location engine.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
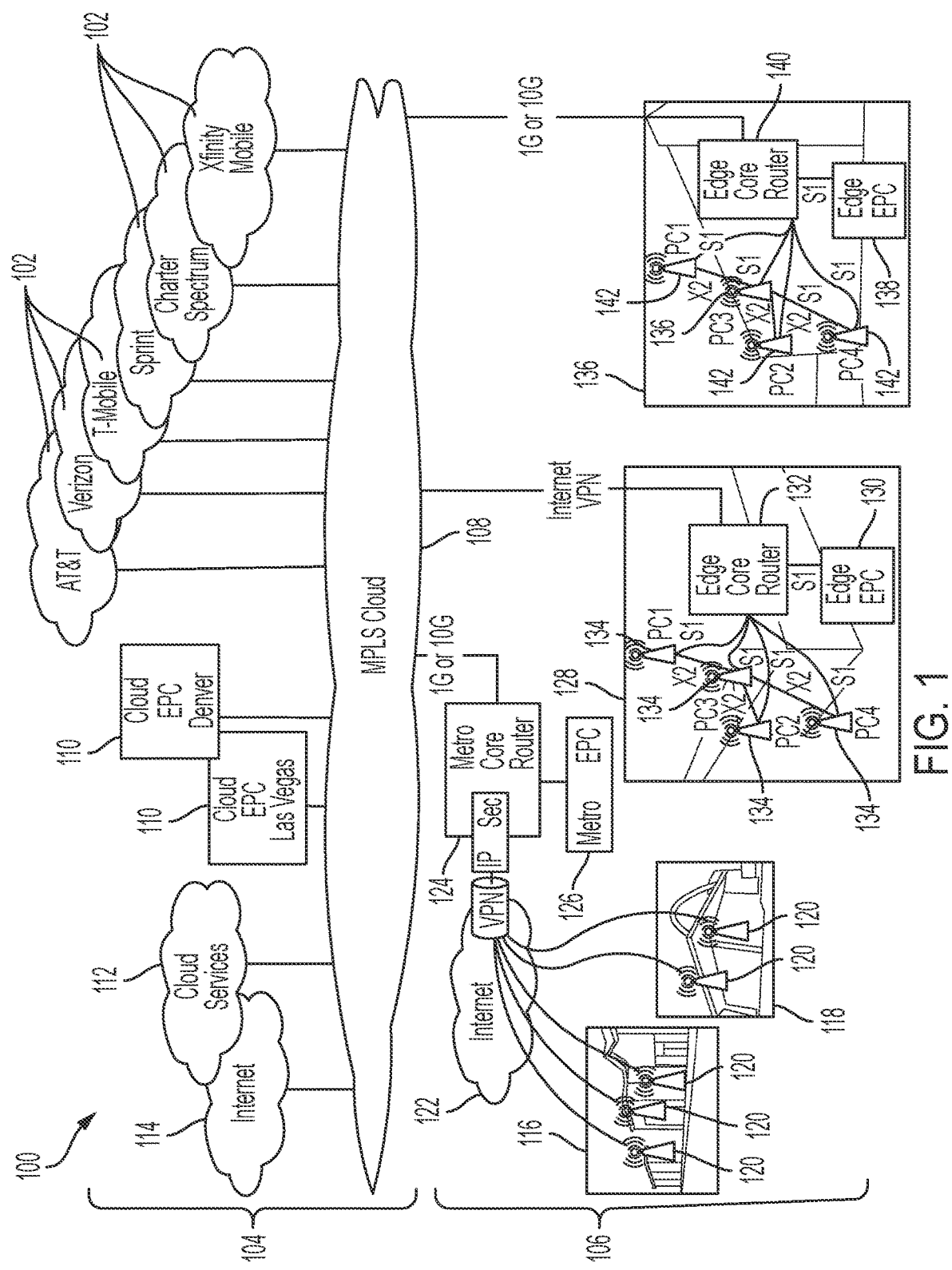
FIG. 1 illustrates an overview of a private cellular network ecosystem, according to an aspect of the present disclosure.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

As noted above, one or more example embodiments of inventive concepts are directed to using private cellular networks and the infrastructure thereof to obtain more accurate location information associated with a request for emergency services and communicating the same with an emergency call center. Such a request may be made via an endpoint connected to a private cellular network within a confined geographical space. In one example, the use of a private cellular network in a confined space can allow for more accurate determination of the location of an emergency incident within the confined space and communication of the same to an emergency call center. Providing the emergency call center with detailed information on the location of the incident inside the confined space (compared to information on approximate location of the confined space currently provided to emergency call centers) can allow an emergency service provider to reach the incident location faster to attend to the underlying emergency situation potentially eliminating or reducing human and financial costs of the emergency incident.

The disclosure begins with a description of an example private cellular network infrastructure and various non-limiting example implementations and operations thereof with reference to FIGS. 1-6. Thereafter, several examples of using a private cellular network for providing endpoint specific location information associated with an emergency incident inside a confined location will be described with reference to FIGS. 7-9. The disclosure concludes with a discussion of example system components with reference to FIGS. 10A-10B.

A private cellular network within the context of the present disclosure is an ecosystem comprised of a backend component (a cloud component) and a site component. A site component may be comprised of specially configured hardware components installed at a site to provide cellular network (voice and data) connectivity to endpoints connected thereto.

A site component can be comprised of a number (e.g., ranging from single digit numbers to hundreds or thousands) of radio access components (e.g., small cell radio components that provide network connectivity such as LTE small cells, 5G access nodes, etc.) that are deployed over a limited geographical area (e.g., a building, a factory floor, a neighborhood, a shopping mall, etc.) and operate over a spectrum available for private use. The site component further includes known or to be developed radio equipment such as routers and core network components (Evolved Packet Core (EPC) components). EPC components can be 4G/LTE EPC components and/or 5G EPC components/functionalities.

For example, 4G/LTE EPC components include, but are not limited to, a Serving GPRS Support Node (SGSN), Gateway GPRS Support Node (GPRS) Mobile Switching Center (MSC), a Mobility Management Entity (MME), Home Subscriber Server (HHS), a Serving Gateway (S-GW), a Packet Data Network Gateway (PDN-GW), a Policy & Charging Rules Function (PCRF).

In another example, 5G EPC components include, but are not limited to, a Authentication Server Function (AUSF), a Core Access and Mobility Management Function (AMF), a Data network (DN), a Structured Data Storage network function (SDSF), an Unstructured Data Storage network function (UDSF), a Network Exposure Function (NEF), a NF Repository Function (NRF), a Policy Control function (PCF), a Session Management Function (SMF), a Unified Data Management (UDM), a User plane Function (UPF), an Application Function (AF), etc. Components of a 5G core can be referred to as functionalities as most are software based and can be adapted according to need and use case.

The site component can also include IP Multimedia Subsystem (IMS) for delivering IP multimedia services such as Voice over LTE (Vo-LTE) through IMS core. IMS core can handle IMS functionalities including, but not limited to, subscriber management, session setup and policy and charging enforcement, maintaining Quality of Service (QoS) and seamless interfacing between IMS Application Servers and the EPC.

The backend (cloud) component may provide one or more EPC functionalities (e.g., HSS services), manage interfacing and communication of the private cellular network with MNOs, allow mobility among users of the private cellular network by enabling them to move between multiple site components and still access their home site component, etc. Services provided by the backend component may be shared by/segmented for use by multiple private cellular networks that function independently as they may have been deployed at different sites and operated by different/independent enterprises. Additionally, the backend component may include networking and management tools (Network as a Service (NaaS)) built and deployed over network components (e.g., NaaS developed by Geoverse LLC of Seattle, Wash.) that are trusted by operators of the private cellular networks and various mobile network operators (MNOs) that, as will be described below, have suboptimal coverage in these confined geographical locations and thus have their endpoints and subscribers roam on such private cellular networks.

Such ecosystems, as described above, offer a fully interconnected private cellular network with a number of significant advantages to enterprises and MNOs. These ecosystems are flexible and scalable and eliminate costs and complexities associated with enterprises having to develop their own private network capabilities and/or costs and complexities associated with MNOs having to expand their network infrastructure and services to provide cellular connectivity to their subscribers and endpoints.

A fully integrated ecosystem described above provides premium connectivity services to both home and guest (roaming) devices coupled with various analytical features such as end user experience, service usages, indoor location determination and indoor mapping as well as capacity monetization including, but not limited to, potential sale of excess capacity to mobile operators and others.

Premium connectivity services include, but are not limited to, Subscriber Identity Module (SIM) subscriptions, shared data bundles, private cellular (LTE) voice, edge computing capabilities, etc. home and guest (roaming) devices include, but are not limited to, bridges, gateways, modems, push-to-talk devices, smartphones, tablets, laptops, Internet of Things (IoT) devices such as facility management devices, HVAC control devices, security monitoring devices, point of sale devices, sensors for maintenance, asset tracking, etc., robotics and autonomous vehicles, etc.

Cellular connectivity and services may be provided to guest devices by the private cellular network where the cellular connectivity services of the devices' home networks may be sub-optimal/less than a threshold level of service. Such threshold level of service may be a configurable parameter determined based on experiments and/or empirical studies. For example, when cellular data services offered by a home network is less than a threshold download/upload speed (in mbps) or such services of slower than same services provided by private cellular network by more than a threshold percentage (e.g., slower by more than 5%, 10%, 20%, etc.), private cellular network may be utilized to provide better cellular voice and data services to end users and thus improve end user experience. In addition to download/upload speed, other examples of such thresholds include signal strength (received signal strength indicator), signal quality measurement(s), etc.

FIG. 1 illustrates an overview of a private cellular network ecosystem, according to an aspect of the present disclosure. In ecosystem 100, one or more Mobile Network Operators (MNOs) 102 may interface with private cellular network of the present disclosure, which is comprised of a cloud based backend component 104 and site component 106.

MNOs 102 may include, but are not limited to, known operators of cellular networks such as AT&T®, Verizon®, T-Mobile®, Sprint®, Charter Spectrum®, Xfinity Mobile®, Vodafone® and/or any other known or to be established MNO. In one example, MNOs 102 may have a number of subscribers that may visit site component 106, in which the corresponding MNO(s) may not have sufficient wireless coverage and services available to their subscribers. As will be described below, these subscribers may roam on private cellular network at site component 106 when a roaming agreement is in place and is active between provider of the private cellular network at a site and roaming subscribers' respective MNOs.

Use of the private cellular network described in the present application is not limited to MNO subscribers with home MNOs having an active roaming arrangement in place with the provider of the private cellular network. For example, the private cellular network may be accessed by any mobile device having a dual-SIM capabilities with one SIM card being registered with their home MNO (cellular service provider) and another SIM card registered with the private cellular network. Another example use of private cellular network may be as part of a Multi-Operator Core Network (MOCN) structure, where one or more MNOs and private cellular network of the present disclosure may share the network infrastructure (e.g., edge or metro core router, as will be described below) of the private cellular network for servicing their subscribers.

Backend component 104 may include, but is not limited to, Multi-Protocol Label Switching (MPLS) cloud 108 on which one or more EPCs 110 of the private cellular network (e.g., located in different physical locations/cities) are accessible. Various known, or to be developed, cloud services 112 as well as the Internet 114 are also accessible via cloud 108.

Site component 106 of FIG. 1 includes two non-limiting examples of a metro site and an edge site. As noted above, a site component may include specially configured hardware components that provide network connectivity (cellular voice and data) to connected endpoints.

A metro site component may be deployed in a metropolitan area such that the private cellular network can encompass several/independent confined geographical areas such as a shopping mall comprised of multiple independent stores and locations, one or more blocks of a city, an entire university campus, etc. In FIG. 1, an example metro site is comprised of sites 116 and 118. Example site 116 can be an open air strip mall while example site 118 can be a closed building such as shopping mall. Access points 120 may be installed throughout sites 116 and 118 and communicate via Internet 122 (e.g., over known or to be developed Virtual Private Network (VPN) and IP security (IPSec) connections and protocols) with a private cellular edge formed of a metro core router 124 and a metro EPC 126. Metro core router 124 may be connected to MPLS cloud 108 and cloud backend component 104 via any known or to be developed wired and/or wireless connection (e.g., a 1G or a 10G connection).

An edge site component may be deployed in a single location providing cellular connectivity to users of and roamers associated with a single entity (e.g., a single corporation or business entity) and covers a confined geographical area that is smaller and more limited compared to a metro site. Another distinction between an edge site component and a metro site component is that each edge site is equipped with a dedicated edge core router and edge EPC (serving a single entity or enterprise network of a corporation, etc.) while several components of a metro site component may be shared by connected endpoints of several different entities as they share the same metro core router and metro EPC as described above.

Example edge sites component 128 of FIG. 1 may be at a factory site with a dedicated edge core router 130 and a dedicated edge EPC 132. Edge site component 128 may also have one or more access points 134 installed throughout the site and communicatively connected to edge core router 130 and edge EPC 132.

Example edge site component 136 may be a building with a dedicated edge core router 138 and a dedicated edge EPC 140. Edge site component 136 may also have one or more access points 142 installed throughout the site and communicatively connected to edge core router 138 and edge EPC 140.

Each of edge core routers 130 and 138 may be communicatively connected to MPLS cloud 108 and cloud backend component 104 via known or to be developed connections such as a VPN connection, a wired 1G/10G connection, etc.

Edge core routers 130, 138 a metro core router 124 may also be referred to as proxy routers.

Figure 2:
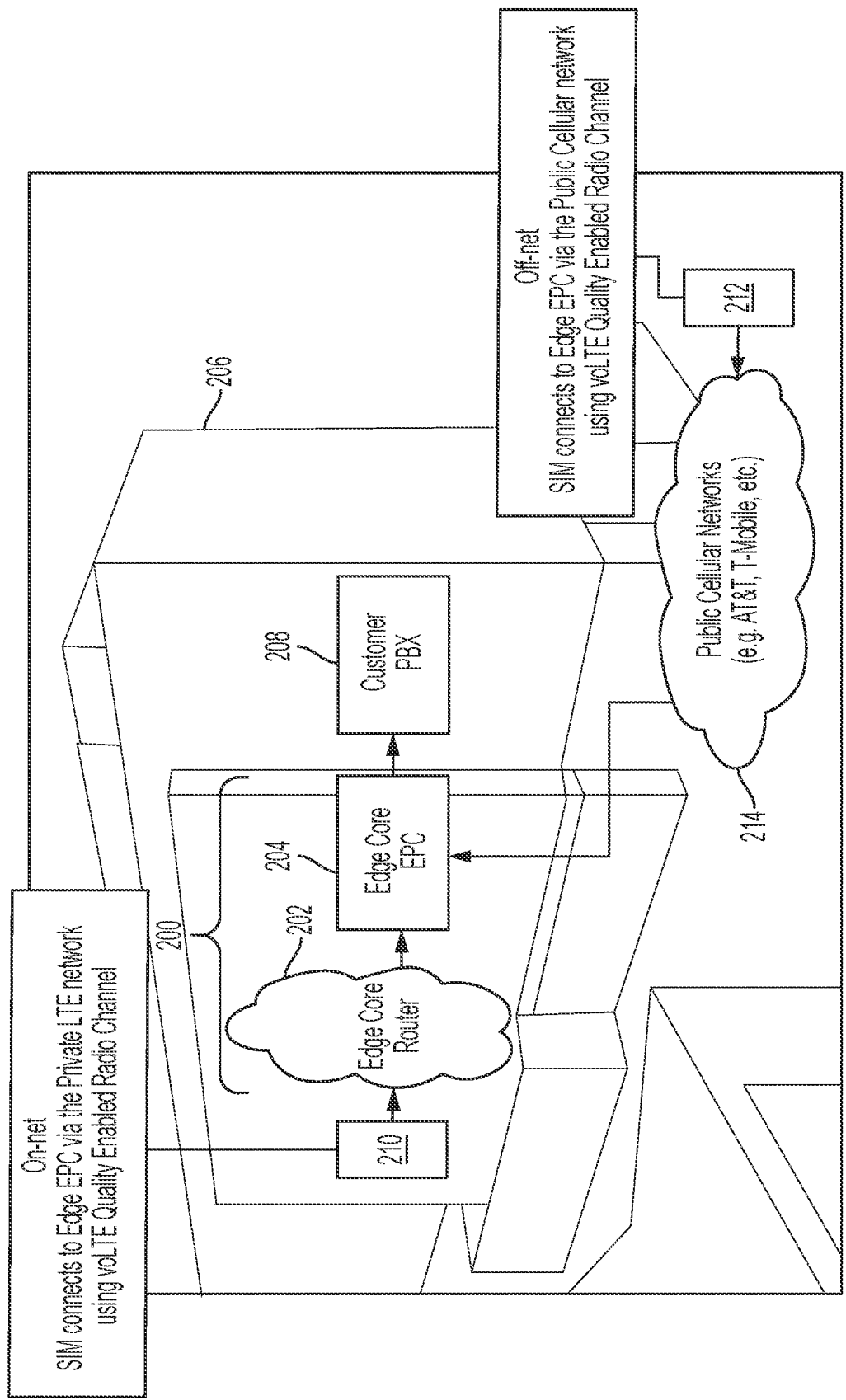
FIG. 2 illustrates an overview of an edge site component of a private cellular network deployed at an edge site, according to an aspect of the present disclosure.

FIG. 2 illustrates an overview of an edge site component of a private cellular network deployed at an edge site, according to an aspect of the present disclosure. Edge site component 200 of FIG. 2 may be the same as edge site component 136 of FIG. 1 with a dedicated edge core router 202 and a dedicated edge EPC 204 that may be the same as dedicated edge core router 138 and edge EPC 140, respectively. An enterprise network may be deployed in a building (edge site/customer site) 206 or a portion thereof occupied by an organization, entity, etc., Such enterprise network may be coupled to edge site component 200 so that edge site component 200 can provide private cellular network connectivity to endpoint devices of the enterprise network and/or any one or more external devices (not registered or part of enterprise network) present at edge site 206 and for which their corresponding MNO has an agreement in place with operator of edge site component 200 or otherwise is considered a valid UE/data source as described above and will be described further below.

The enterprise network may have one or more enterprise specific endpoints such as Private Branch Exchange (PBX) devices 208. PBX devices 208 may form a private telephone network of an organization associated with the enterprise network at edge site 200. Other examples of enterprise specific endpoints include, but are not limited to, mobile device 210, one or IoT devices (not shown), tablets, laptops, desktops, switches, routers, etc. (not show).

In example of FIG. 2, mobile device 210 may be a device registered with the enterprise network and the private cellular network provider. Accordingly, mobile device 210 may be provided with a SIM card registered with the private cellular network provided via edge site component 200. Mobile device 210 may be referred to as home mobile device 210 for which the private cellular network deployed at edge site 200 serves as the primary cellular service provider. Accordingly, mobile device 210 may connect to edge core router 202 and subsequently to the rest of the private cellular network to receive voice (e.g., LTE/5G quality voice (VoLTE)) and cellular data services. Furthermore, any one or more roaming/guest devices may roam on the private cellular network provided via edge site component 200, as will be described above. Such roaming/guest devices may not have a SIM card registered with private cellular network provided by edge site component 200 and instead may be registered with one or more of MNOs described above with reference to FIG. 1, serving as corresponding home cellular network providers of the roaming/guest devices.

Also, shown in FIG. 2 is an example of another home mobile device 212 that is registered with the private cellular network deployed via edge site component 200. However, mobile device 212 may be located outside building/site 206 such that mobile device 212 no longer falls within footprint/coverage area of the deployed private cellular network. Mobile device 212 can fall within the footprint of a cellular base 214 (e.g., LTE base station, eNode-B, etc.) of an MNO, examples of which are described above with reference to FIG. 1. Mobile device 212 can then connect to cellular base 214 and to edge EPC 204 to receive cellular voice and data services.

Figure 3:
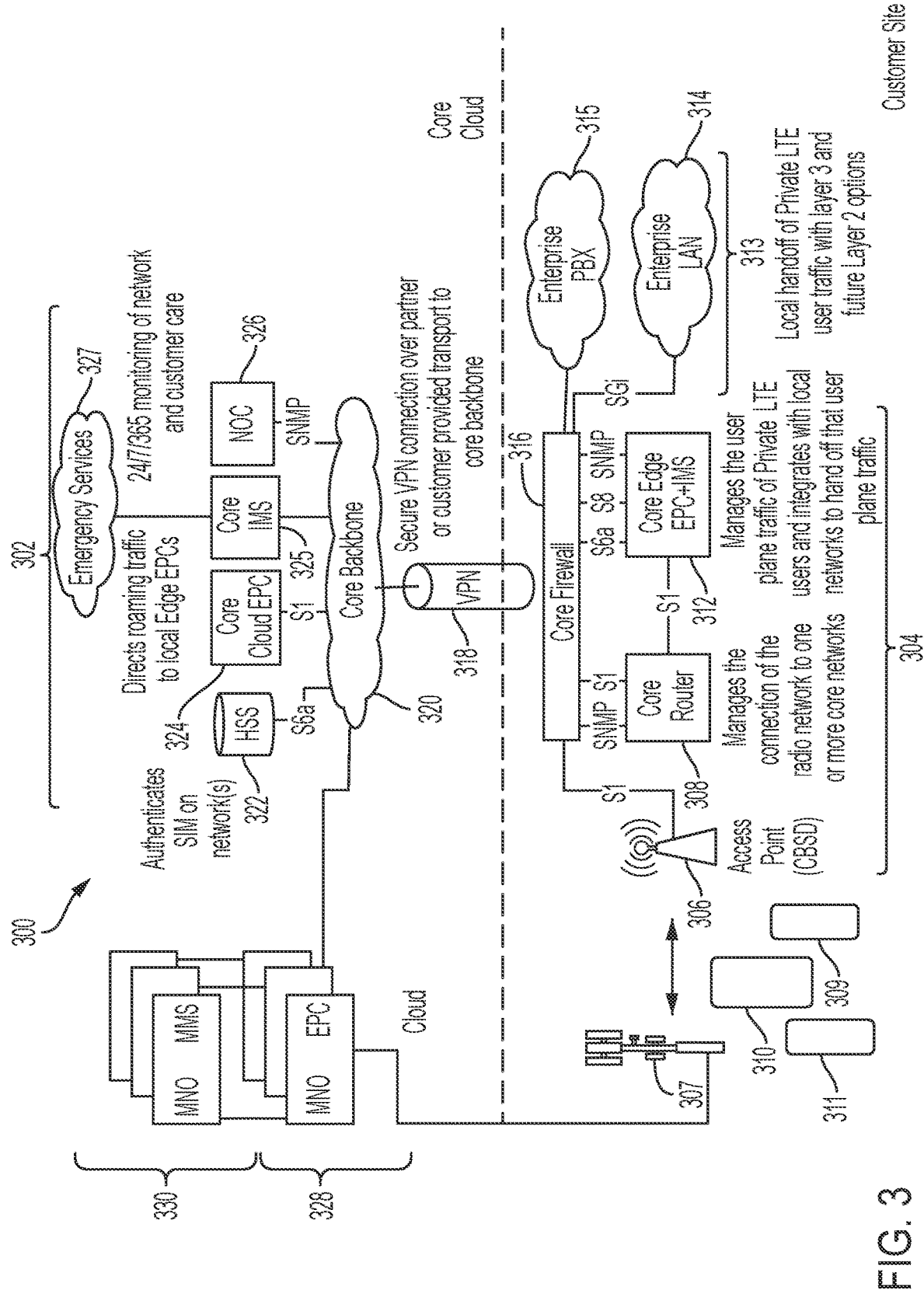
FIG. 3 illustrates details of cloud and site components of ecosystem of a private cellular network, according to an aspect of the present disclosure.

FIG. 3 illustrates details of cloud and site components of ecosystem of a private cellular network, according to an aspect of the present disclosure. As described above with reference to FIGS. 1 and 2 as well, ecosystem 300 is comprised of backend component 302 and site component 304, which may be the same as backend component 104 and site component 106 of FIG. 1, respectively. Backend component (cloud component) 302 and site component 304 may form a private cellular network configured to provide cellular voice and data services to one or more home devices of an enterprise network (at a customer site) that is communicatively coupled to site component 304.

In addition to backend component 302 and site component 304, FIG. 3 also illustrates, in general, components of MNOs and an example enterprise network communicatively coupled to cloud component 302 and site component 304, respectively, and will be further described below.

Site component 304 may have one or more access points 306 (e.g., a Citizens Broadband Radio Service (CBRS) access point) coupled to an edge core router 308, all of which may be deployed at a customer site, which can be the same as edge site 206 of FIG. 2.

Edge core router 308, as will be described below, is a specially configured router for managing network traffic (inbound and outbound) to and from connected endpoints such as endpoints 309, 310 and 311 (each of which may also be referred to as a user equipment (UE)). A number of UEs connected to private cellular network at the customer site is not limited to 3 and can be more or less.

UEs 309, 310 and 311 can be any one of, but not limited to, a mobile device, a tablet, a laptop, an Internet of Things (IoT), a sensor, etc. In other words, UEs 309, 310 and 311 can be any device capable of establishing a wireless/cellular connection to nearby device.

As will be further described below, any number of UEs may be registered with enterprise network 313. Furthermore, one or more of UEs 309, 310 and 311 may be roaming devices that are not registered with enterprise network 313 but instead are associated with MNOs that have roaming agreements in place with provider of private cellular network at the customer site and hence are allowed to roam on the private cellular network.

One or more of UEs 309, 310 or 311 may also be a dual-SIM device registered with both a home MNO and private cellular network without the MNO necessarily having a roaming arrangement in place with the private cellular network. In another example, any one or more of UEs 309, 310 or 311 may be a subscriber of an MNO being part of a MOCN with private cellular network of the present disclosure. All such UEs may be considered valid UEs (which may also be referred to as a valid source of a data packet) that may access private cellular network of the present disclosure and have core router of the private cellular network service (route) their respective inbound/outbound voice and data traffic.

Accordingly and while example embodiments are primarily described with reference to a roaming UE with a home MNO that has an active roaming agreement in place with the provider of private cellular network of the present application, as an example of a valid UE, the present disclosure is not limited thereto. A valid UE may also be a dual-SIM UE or a UE of a subscriber with an MNO that is part of a MOCN with the private cellular network. Similarly, the present disclosure may frequently refer to services provided by the private cellular network and edge core router 308 to a valid UE as roaming services. Such services are not limited to roaming services commonly referred to in the relevant art but may also include secondary/auxiliary LTE services. Accordingly, services provided by private cellular network of the present disclosure may be referred to as complimentary (and/or secondary or auxiliary) cellular services.

Edge core router 308 may be coupled to edge EPC 312 (e.g., via a S1 LTE connection shown in FIG. 3). In example of FIG. 3, edge EPC 312 also provides IMS services described above. Edge EPC 312 may be configured to manage user plane traffic of private cellular users (e.g., user equipment and connected endpoints of enterprise network 313 for which the private cellular network serves as a home cellular service provider). Edge EPC 312 may interface with enterprise Local Area Network (LAN) 314 to handoff user plane traffic to enterprise network 313 (with layer 3/layer 2 option). An example connection between edge EPC 312 and enterprise network 313 may be via a SGi interface/connection as shown in FIG. 3. Enterprise network 313 may include enterprise equipment and devices such as enterprise LAN 314 and enterprise PBX 315 described above.

Site component 304 may further include a firewall 316 that interfaces with access point 306, edge core router 308, edge EPC 312, with access point 306 and components of enterprise network 313. As shown in FIG. 3, firewall 316 may interface with access point 306 via a dedicated S1 interface. Firewall 316 may interface with edge core router 308 via another dedicated S1 connection and Simple Network Management Protocol (SNMP) protocol. Firewall 316 may interface with edge EPC 312 via S6a and S8 connections and Simple Network Management Protocol (SNMP). Furthermore, firewall 316 may be connected to enterprise LAN 314 via a SGi connection.

Backend component 302 may be communicatively connected to site component 304 via any known or to be developed secure communication medium such as a secure VPN connection 318.

Backend component 302 may include a backbone 320 and communicatively coupled to one or more cloud based servers (may be geographically distributed) and may be proprietary or provided via third party providers of private/public/ hybrid cloud infrastructure. Any one or more of such cloud based servers may be a HSS server 322 configured to authenticate SIM cards associated with the private cellular network (e.g., a SIM card activate in UE 310) and/or a SIM card of an MNO with an associated UE roaming on the private cellular network at the customer site shown in FIG. 3 and similarly described in FIG. 2. Another one of such servers may be a cloud EPC 324. Cloud EPC 324 may function to direct home traffic originating from one site component such as site component 304 to another site component of the same private cellular network. For example, an organization may have offices in multiple cities, all of which may be operating on enterprise network 313. Site component 304 of the private cellular network may be deployed at each one of the multiple offices. Accordingly, local cellular traffic from one site component 304 at one of the offices may be directed to the private cellular network deployed at another office via cloud EPC 324.

Backend component 302 may also include an IP Multimedia Service (IMS) 325 for communicating/processing requests for IMS services to appropriate IMS processing components of home networks. IMS 325 may also process/forward requests for emergency services (e.g., 911 services) to appropriate providers of such services such as emergency services 327.

Backend component 302 may further include an additional server 326 that may be referred to as Network Operation Center (NOC) 326 configured to manage operation of the private cellular network ecosystem and provide NaaS services described above and services such as network monitoring, customer service, etc.

Backbone 320 may be communicatively coupled to HSS 322 via an S6a connection, to cloud EPC 324 via an S1 interface, to IMS 325 via any known or to be developed communication scheme/protocol and to NOC 326 via an SNMP protocol.

As also shown in FIG. 3, backbone 320 may be connected/communicatively coupled to multiple MNOs. FIG. 3 illustrates an example of three different MNOs, each of which has a corresponding MNO EPC from among the three examples of MNO EPCs 328. Each MNO EPC from MNO EPCs 328 may optionally have a corresponding MNO IMS from among MNO IMSs 330 shown in FIG. 3. Alternatively, multiple MNO EPCs 328 may share a common MNO IMS 330. A combination of one MNO EPC 328 and one MNO IMS 330 may be referred to as an MNO.

Furthermore, each MNO EPC 328 may be communicatively coupled to a cell tower such as cell tower 307. While FIG. 3 illustrates a single cell tower 307, each MNO may have a separate cell tower similar to cell tower 307 to which it is communicatively coupled. In the non-limiting example of FIG. 3, a single tower 307 may be shared by all MNOs formed by MNO EPCs 328 and MNO IMSs 330.

Cell tower 307 is intended to provide cellular and voice data coverage to one or more subscribers such as UEs 309, 310 and/or 311. However, for various reasons, such coverage may be limited or unavailable to UEs 309, 310 and/or 311. For example, coverage of a given MNO may be weak or otherwise not allowed inside the geographical location (customer site) in which the enterprise LAN 314 and the private cellular network is deployed, hence a corresponding one of UEs 309, 310 or 311 may be operating as a guest device on the private cellular network.

A given MNO comprised of one of MNO EPCs 328 and optionally one of MNO IMSs 330 may operate as home network of one or more UEs (e.g., UEs 309, 310 and 310) roaming on the private cellular network provided by backend component 302 and site component 304 at the customer site (e.g., because coverage of the home network within the site in which the private cellular network is deployed, may be suboptimal (less than a threshold coverage)). Connection between backbone 320 and MNO networks 328 may be via any known or to be developed communication link such as roaming links (S8 interface) and IPX connections.

With example overview and structure of a private cellular network described above with reference to FIGS. 1-3, one or more example processes will be described with reference to FIGS. 4-7 according to which a core router of a private cellular network deployed at a customer site (e.g., an edge site) monitors, manages and routes network traffic to in-network and out-network (e.g., home MNOs of roaming devices) destinations.

Figure 4:
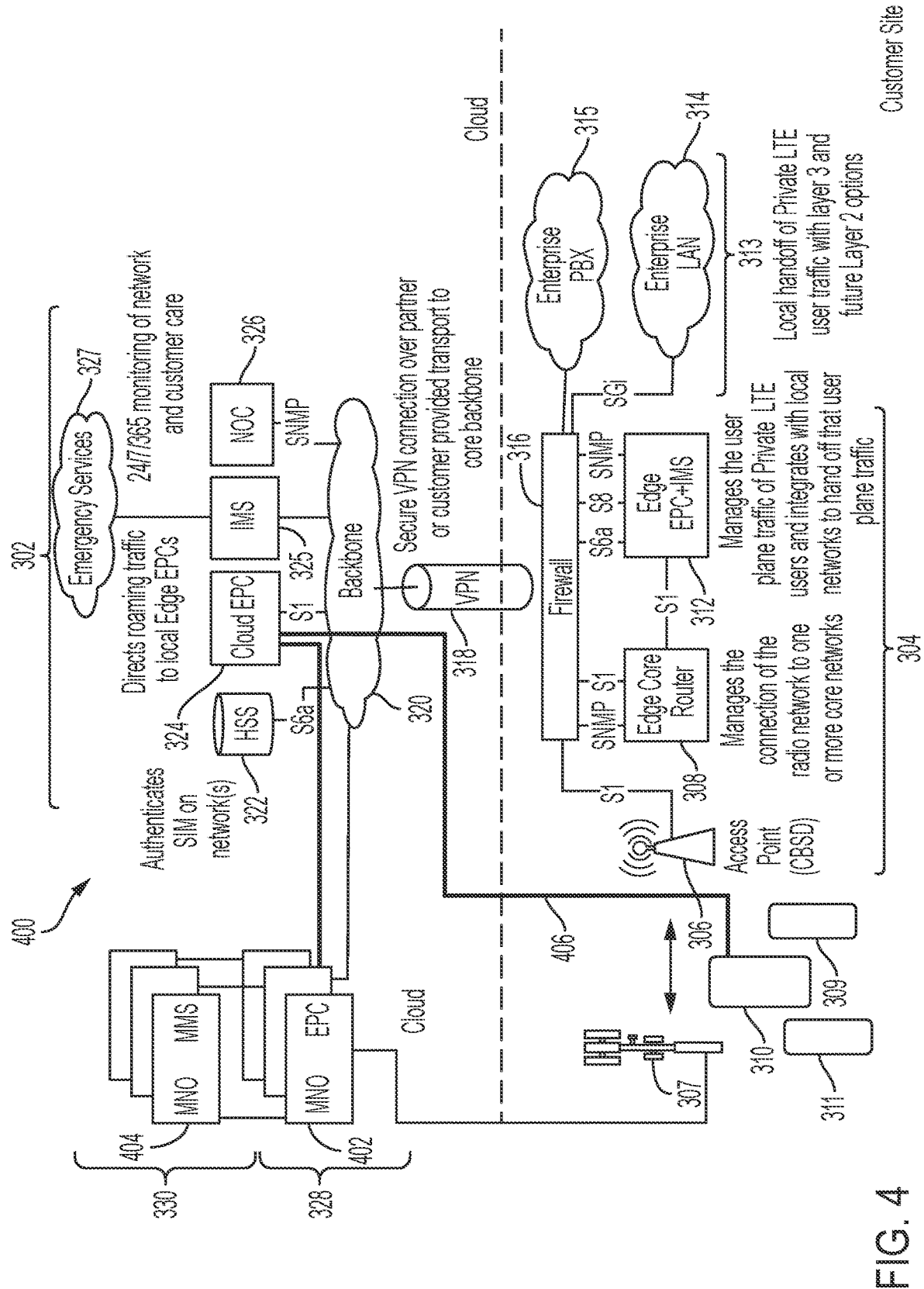
FIG. 4 is a visual representation of an example traffic routing via core router of a private cellular network, according to an aspect of the present disclosure.

FIG. 4 is a visual representation of an example traffic routing via core router of a private cellular network, according to an aspect of the present disclosure. Elements in FIG. 4 that are the same as their corresponding counterpart in FIG. 3 are numbered the same as in FIG. 3 and will not be further described for sake of brevity. For example, HSS 322 in FIG. 4 is the same as HSS 322 in FIG. 3 and will not be further described with reference to FIG. 4.

In ecosystem 400 of FIG. 4 and in comparison with FIG. 3, UE 310 may be a guest/roaming device that is roaming on/using services of private cellular network provided by backend component 302 and site component 304 at the customer site, as described above. Such guest UE 310 may be a subscriber of an MNO associated with one of MNO EPCs 328 and one of IMSs 330. Coverage of MNO 328 may be weak or otherwise not allowed inside the confined geographical location of the customer site in which the enterprise LAN 314 and the private cellular network is deployed, hence why UE 310 may be operating as a guest device on the private cellular network.

As shown in FIG. 4, an example cellular (e.g., LTE) data call may be originated from UE 310 that is routed first to edge core router 308. By examining header information associated with data packets received from the guest UE 310, edge core router 308 may determine that the data call is to be routed to one of MNO EPCs 328 of the home MNO of UE 310. In this particular example, it is assumed that MNO EPC 402 and MNO IMS 404 form the home MNO of UE 310. As will be described below, edge core router 308 determines that UE 310 is a valid source of the data call (e.g., home MNO of UE 310 has an active agreement in place with operator of private cellular network at the customer site) and thus routes the data packets to backend component 302 to be forwarded to appropriate one of MNO EPCs 328 (in this example MNO EPC 402). The routing of the packet is shown via line 406. As shown, after edge core router 308 identifies MNO EPC 402 as the destination for data call packets received from UE 310, the packets are routed to cloud EPC 324 via firewall 316, VPN connection 318 and backbone 320, where cloud EPC 324 routes the packets to MNO EPC 402. Given the active agreement between home MNO of UE 310 and the private cellular network, UE 310 may be considered a valid source of the received data packet.

In another example, UE 309 is also a guest device attempting to roam on private cellular network provided at site component 304. However, home MNO of UE 309 may not have a roaming agreement in place with operator of the private cellular network at the customer site or may have had a roaming agreement that is now expired. Accordingly and upon receiving a data packet from UE 309, edge core router 308 may determine that UE 309 does not have permission or is not authorized to use private cellular network at the customer site (for example, edge core router 308 may be provisioned with proper information for which UEs are valid or not such as UEs having MNOs with valid roaming agreement, dual-SIM UEs, UEs with MNOs utilizing a MOCN with private cellular network, as described above). Therefore, edge core router 308 may drop data packets received from UE 309. In this example and given no active roaming agreement between home MNO of UE 309 and the private cellular network, UE 309 may be considered an invalid source of the received data packet.

In another example, UE 311 may be a registered device of enterprise network 313, which is another example of a valid source/UE of the received data packet. Accordingly, when edge core router 308 receives a data packet from UE 311, edge core router 308 may send the data packet to enterprise LAN 314 to be forwarded to intended destination on enterprise network 313 (e.g., one of PBX devices of enterprise PBX 315). Furthermore, private cellular network at the customer site provides/extends cellular services (cellular voice and data services) to UE 311. Such cellular services may be LTE data service for UE 311 placing a video call to an external destination (outside enterprise network 313)

Figure 5:
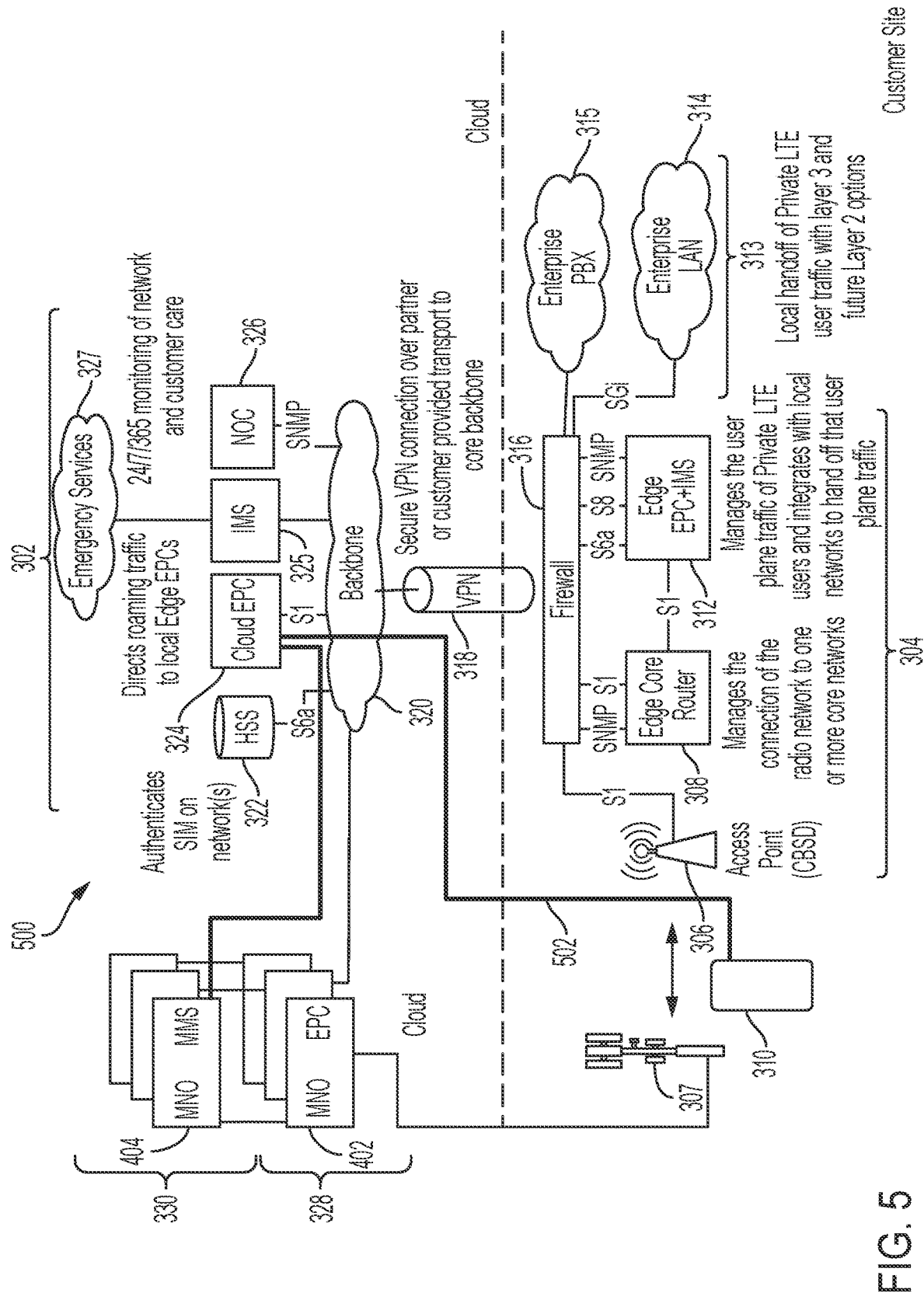
FIG. 5 is a visual representation of an example traffic routing via core router of a private cellular network, according to an aspect of the present disclosure.

FIG. 5 is a visual representation of an example traffic routing via core router of a private cellular network, according to an aspect of the present disclosure. Elements in FIG. 5 that are the same as their corresponding counterpart in FIGS. 3 and 4 are numbered the same as in FIGS. 3 and 4 and will not be further described for sake of brevity.

In describing FIG. 4, an example was described where a data packet is received at edge core router 308, from UE 310. In that example, it was assumed that UE 310 is a valid source of the data packet (e.g., home MNO of UE 310 has an active roaming agreement in place with private cellular network at the customer site). FIG. 5 describes a non-limiting example, where a data packet or a call received at edge core router 308 from UE 310 is an IMS request (e.g., an emergency VoLTE call) such that the data packet or the call should be routed to MNO IMS 404. This routing is shown by line 502.

In another example, a home MNO may have multiple dedicated EPCs and IMSs for different categories of endpoints and subscribers. For example, an MNO provider may have a dedicated/prioritized core network for first responders subscribed thereto. Such EPC may have high redundancy (high reliability) but less processing capabilities. In another example, an MNO provider may also have a dedicated/prioritized core network for designated groups of commercial subscribers that should be prioritized over non-commercial subscribers.

In another example, a given MNO may have multiple EPCs for different types of incoming data. For example, UE 310 may be an IoT device and thus processing of the transmitted data may not require high processing capacity. Accordingly, for data originating from IoTs, edge core router 308 is configured to identify such origin and route it to a different EPC of home MNO of UE 310 than one to which data originating from a non-IoT UE (e.g., a mobile device) is forwarded.

In example of FIG. 5, UE 310 may be a prioritized commercial subscriber of its home MNO and/or may be associated with first responder group of its home MNO. Accordingly, by analyzing header of an emergency data packet received from UE 310, edge core router 308 routes the data packet to MNO EPC 404.

While FIG. 5 describes multiple different examples, each example is described in the context of receiving a data packet from a single UE. In another example, edge core router 308 may receive multiple data packets from multiple different UEs, some of which are from valid sources (having home MNOs with active agreements with private cellular network at customer site), some of which are invalid sources (having home MNOs with no active agreements with private cellular network at customer site) and some of which are devices associated with enterprise network 313 at customer site (also considered valid sources). Edge core router 308 is capable of simultaneously processing all received packets and (1) send each valid data packet to an EPC or IMS of a corresponding home MNO or to emergency services 327, (2) drop data packets from invalid sources and (3) forward data packets from sources associated with enterprise network 313 to enterprise LAN 314.

Figure 6:
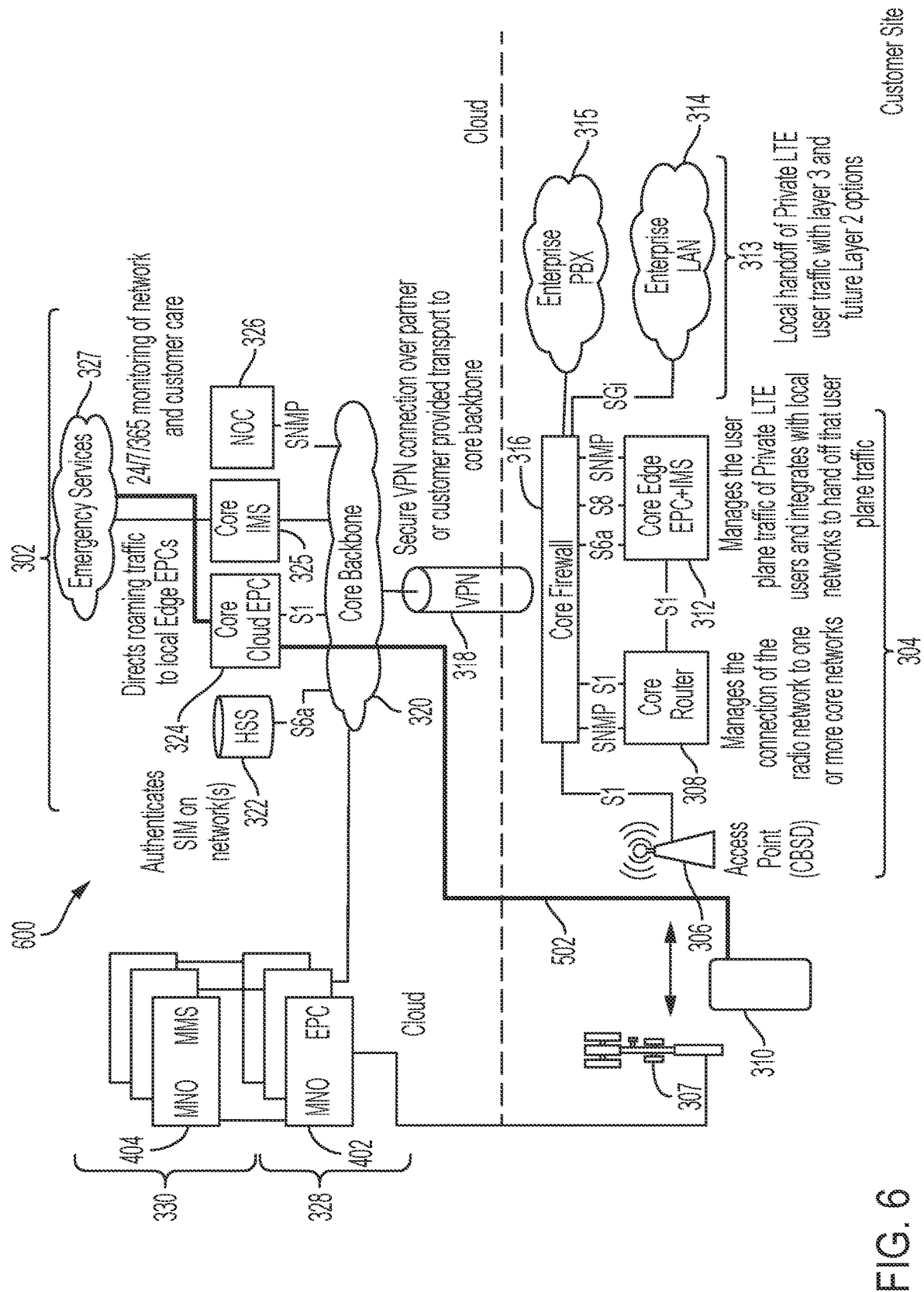
FIG. 6 is a visual representation of an example traffic routing via core router of a private cellular network, according to an aspect of the present disclosure.

FIG. 6 is a visual representation of an example traffic routing via core router of a private cellular network, according to an aspect of the present disclosure. Elements in FIG. 6 that are the same as their corresponding counterpart in FIGS. 3-5 are numbered the same as in FIGS. 3-5 and will not be further described for sake of brevity.

In ecosystem 600 of FIG. 6, network traffic originating from guest UE 310 (assumed to be a subscriber of an MNO having an active roaming agreement with private cellular network at customer site) may be an emergency call (e.g., a 911 call for emergency assistance). In another example, such emergency call may be from a home UE such as UE 311 (not shown in FIG. 6), which should be similarly processed and forwarded to emergency services 327. By examining header information associated with data packets received from the guest UE 310, edge core router 308 may determine that the emergency call is to be routed to emergency services 327 (emergency services provider 327). The routing of the packet is shown via line 602. As shown, after edge core router 308 identifies emergency services 327 as the destination for voice call packets received from UE 310, the packets are routed to cloud EPC 324 via firewall 316, VPN connection 318 and backbone 320, where cloud EPC 324 routes the packets to IMS component 325 to be forwarded to emergency services 327 or more specifically to a call/control center of emergency services 327.

Figure 7:
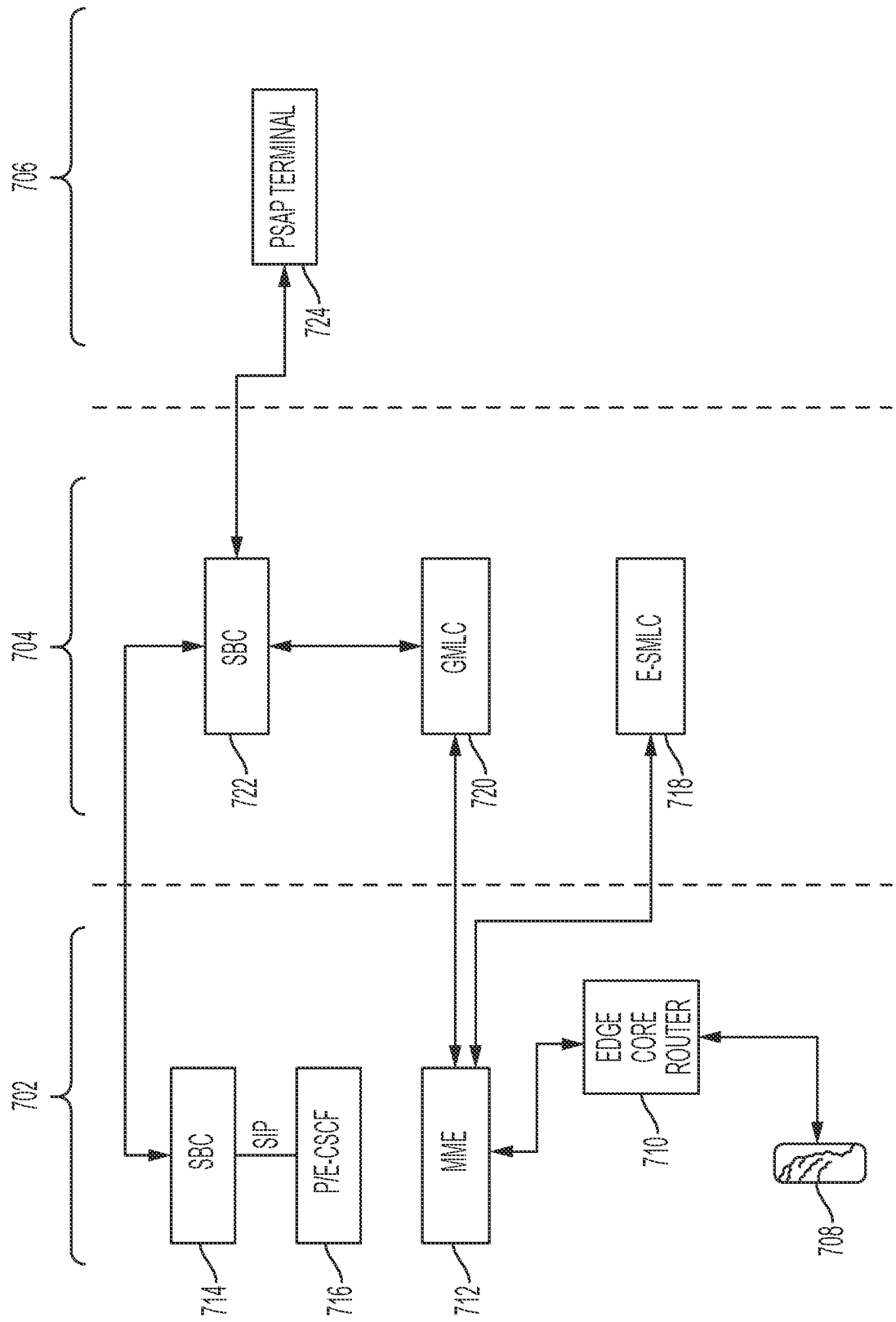
FIG. 7 illustrates a path taken between a UE placing an emergency call and an emergency service provider, according to an aspect of the present disclosure.

FIG. 7 illustrates a path taken between a UE placing an emergency call and an emergency service provider, according to an aspect of the present disclosure.

Ecosystem 700 includes three main components, namely private cellular network 702, an Emergency Service Router (ESR) 704 (intermediary service provider 704) and a Public Safety Answering Point (PSAP) 706.

Private cellular network 702 can be the same as example private cellular networks described above with reference to FIGS. 1-6 (e.g., private cellular network formed of backend component 302 and site component 304 in FIG. 3). ESR 704 may be an intermediate provider that receives emergency service requests from a user on a network (e.g., a UE on private cellular network 702), determines location information of a UE from which an emergency service request is received and forwards the same to PSAP 706. PSAP 706 can be any known or to be established service that responds to emergency calls and requests by dispatching first responders and/or emergency service providers to the location of the UE from which an emergency call is received.

Private cellular network 702 includes an example UE 708, edge core router 710, a Mobility Management Entity (MME) 712, a Session Border Controller (SBC) 714 and a Proxy/Emergency Call Session Control Function (P/E-CSCF) 716. UE 708 can be the same as any one or more of UEs 309, 310 and 311 of FIG. 3. Edge core router 710 can be the same as edge core router 308 of FIG. 3. Private cellular network 702 may be operational within a confined geographical location such as sites 116, 118 and/or 206 of FIGS. 1 and 2 (e.g., a building, a warehouse, a commercial complex, etc.)

MME 712, SBC 714 and P/E-CSCF 716 may be functionalities that reside in edge EPC of private cellular network 702 that can be the same as edge EPC 312 of FIG. 3 and/or backend component of private cellular network 702 that can be the same as backend component 302 of FIG. 3.

MME 712 can be an LTE network component responsible for tracking and paging procedures and controlling the corresponding signaling between a UE and its serving cell (e.g., edge core router 710 of private cellular network 702) for data-packet exchanges. SBC 714 is a network element deployed to protect Session Initiated Protocol (SIP) based Voice over IP (VoIP) networks.

SBC 714 is a network element deployed to protect Session Initiated Protocol (SIP) based Voice over IP (VoIP) networks.

P/E-CSCF 716 can provide control function in the IP Multimedia Subsystem (IMS) Core Network (e.g., edge EPC+IMS 312 or IMS 325 of FIG. 3) to set up, establish, modify, and tear down multimedia sessions. P/E-CSCF 716 is an edge access function and can be the entry point for UE 708 to request services from edge EPC+IMS 312 or IMS 325. P/E-CSCF 716 can function as a proxy by accepting incoming requests and forwarding them to an entity that can service such request. The incoming requests can be an initial registration, an invitation for a multimedia session or an emergency request. P/E-CSCF 716 can also perform some important edge functions such as maintaining a secure association with UE 708, compression of SIP signaling to minimize latency for an over the air interface, providing policy function by initiating support for IP flow control and authorization of traffic-bearer resources.

While private cellular network 702 is illustrated in FIG. 7 as including a single UE 708 and a single edge core router 710, the present disclosure is not limited thereto and private cellular network 702 may include more than one UE 708 and more than one edge core router 710. Furthermore, components of private cellular network 702 are not limited to those shown in FIG. 7 and may include any other known or to be developed component for the operation thereof such as those described above with reference to FIGS. 1-6. Moreover, private cellular network 702 can be any one of a 4G, LTE and/or a 5G network. Accordingly, components thereof such as MME 712, SBC 714 and/or P/E-CSCF 716 may be modified or replaced to conform to core network components of a 4G, LTE and/or a 5G network.

A network of ESR 704 can have components including, but not limited to, Evolved Serving Mobile Location Center (E-SMLC) 718, Gateway Mobile Location Center (GMLC) 720 and SBC 722.

E-SMLC 718 can reside in a base station controller of ESR 704 and can calculate network-based location of mobile stations requesting emergency services (e.g., UE 708). E-SMLC 718 can control several Location Measurement Units (LMUs), which can measure radio signals to help find UE 708 in an area served by E-SMLC 718.

GMLC 720 can provide functionalities required for location based services.

SBC 722 is a network element deployed to protect Session Initiated Protocol (SIP) based Voice over IP (VoIP) networks.

While several example components are described above with reference to ESR 704, components of network of ESR 704 are not limited to those described with reference to FIG. 7 and may include any other known or to be developed component/functionality for the operation of ESR 704.

PSAP 706 can include a number of terminals 724 for receiving emergency calls. Such terminals can be any type of known or to be developed device including, but not limited to, mobile devices, desktop computers, laptops, handheld tablets, etc. PSAP 706 can include any other known or to be developed components for the operation of PSAP 706 network.

In instances where a private cellular network such as private cellular network 702 is not available (e.g., instead UE 708 is connected to a carrier's network such as one of MNOs described above with reference to FIGS. 1-6), the following sequence of events take place when UE 708 places an emergency call.

The sequence starts with UE 708 placing an emergency call (e.g., dialing 911). The call is routed via a base station (e.g., an LTE base station, a 5G eNode-B, etc., such as cell tower 307 of FIG. 3) to an MME of the carrier's network. The MME 712 may then communicate the emergency call to GMLC 720 of ESR 704 (e.g., via an SLg-diameter interface). GMLC 720 may then determine an approximate location of UE 708 according to any known or to be developed method. For example, GMLC 720 can request the MME to obtain location information from E-SMLC 718 (e.g., via a SLS-diameter interface) and forward the same to GMLC 720. E-SMLC 718 may determine the location of UE 708 based on location information received from UE 708's serving base station. Once the approximate location of UE 708 is determined, GMCL 718 can forward the emergency request to terminal 724 of PSAP 706 (e.g., via an E2 interface).

If UE 708 is inside a confined geographical location such as a building, the exact location of UE 708 inside the building cannot be determined and thus emergency service providers/first responders may not be able to reach/attend to the underlying emergency situation as fast as possible.

However, with UE 708 connected to private cellular network 702 within such confined geographical location, information regarding exact location of UE 708 within the confined geographical location can be communicated to GMLC 720 and subsequently to PSAP 706 in order to allow first/emergency responders to determine the exact location of the emergency and attend to the emergency in a more efficient and faster manner.

Figure 8:
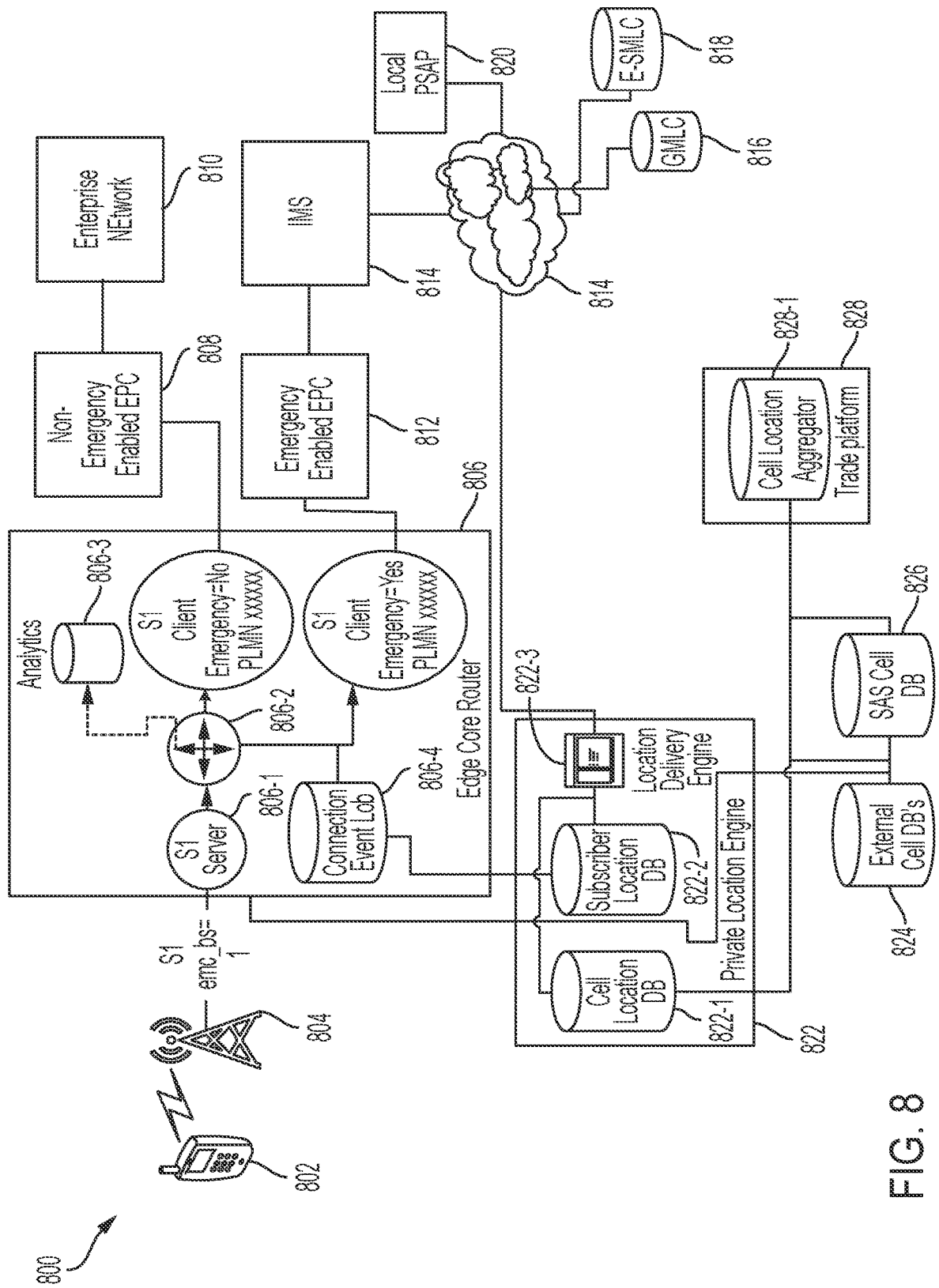
FIG. 8 illustrates an ecosystem of a private cellular network interconnected with emergency call servicers, according to an aspect of the present disclosure.

FIG. 8 illustrates an ecosystem of a private cellular network interconnected with emergency call services, according to an aspect of the present disclosure.

In environment 800, a UE 802 may connect to access point 804. UE 802 can be the same as any one of UEs 309, 310, or 311 of FIG. 3. Access point 804 may be the same as access point 306 of FIG. 3 or any other access point for enabling UE 802 to connect to a private cellular network such as private cellular networks described above with reference to FIGS. 1-8. Access point 804 may be communicatively coupled (through wired or wireless means) to edge core router 806. While FIG. 8 illustrates a single access point 804 connected to edge core router 806, there may be more than one access point connected to the same edge core router 806. For example, multiple access points on different floors of the same building may be connected to the same edge core router 806.

Edge core router 806 may be the same as edge core router 308 of FIG. 306. FIG. 8 illustrates some of the inner logics and components of edge core router 806 configured to enable edge core router 806 to perform routing and managing voice and data exchange between end connected UEs and corresponding destinations, such as that described above with reference to FIGS. 1-7. Such voice and data exchanges may be for emergency call services.

As will be described below with reference to FIG. 9, a call request may be initiated by UE 802. Once the call request reaches edge core router 806 via access point 804, edge core router 806 determines whether the call request is an emergency call request (e.g. based on the format of the incoming call request defined for emergency call services in the 3GPP standards, such as a Voice over LTE (VoLTE) with an emergency (SOS) bearer). This determination may be performed at S1 server 806-1 of edge core router 806. Once edge core router 806 determines that the call request is an emergency call request, edge core router 806 determines, using S1 server 806-1, whether the edge core router 806 and the private cellular network of which edge core router 806 is a component, can support emergency call services. For example, edge core router 806 can determine that the private cellular network can support emergency call services if the S1 Client links in edge core router 806 are configured to support emergency call services or not. If they are configured to support emergency call services, then edge core router 806 sends a message back to access point 804, in which a flag for supporting emergency call services is set to active (e.g., 1). For example, the tag can be emc_bs=1 that is sent to access point 804 over S1 link between access point 804 and edge core router 806. Otherwise, the value of the tag emc_bs is set to zero (0).

Thereafter, using logic 806-2, edge core router 806 determines where to route the call service originating from UE 802. If the call service is an emergency call request (as described above and shown as S1 Client Emergency=Yes with a corresponding Edge core router 806 also if private cellular network of which edge core router 806 is a component can service emergency For example, edge core router 806 may have logics for identified an incoming call request as being an emergency call request or not. This may be, for example, an S1 link between access point 804 to which UE 802 is connected. This S1 link can carry a call request with a corresponding tag for emergency calls (e.g., a tag for emc_bs), which if set equal to one (1), would indicate that the incoming call request from UE 802 is an emergency call request.

Edge core router 806 may determine if an incoming call request is an emergency call request or not (e.g., by determining the value (0 or 1) for the emc_bs tag in the incoming request). For example, an S1 server 806-1 analyzes the incoming call request by running logic 806-2. If a call is determined not to be an emergency call request (S1 Client Emergency=No), edge core router 806 routes the call to a non-emergency enabled EPC 808 using UE 802's PLMN. Non-emergency enabled EPC 808 may be the same as edge EPC 312 of FIG. 3 or cloud EPC 324 of FIG. 3 for serving call requests originating from connected UE 802.

If the call is determined to be an emergency call request (S1 Client Emergency=Yes), edge core router 806 routes the call request to an emergency enabled EPC with the Public Land Mobile Network (PLMN) identifier of UE 802. Otherwise, edge core router 806 routes the call request to a non-emergency enabled EPC with the corresponding PLMN of UE 802. Emergency and non-emergency enabled EPCs will be described below.

In FIG. 8, edge core router 806 also includes an analytics component 806-3 and connection event log generator 806-4. Analytics component 806-3 may be used to collect various Key Performance Indications (KPIs) for UEs connected to and serviced by edge core router 806 such as the identify and subscription information of each connected UE, data usage by each connected UE, etc.

Connection event log generator 806-4 records (logs) information indicative of which radio (e.g., access point 804) the UE is connected to. The connectivity information recorded by connection event log generator 806-4 (possibly in conjunction with KPIs recorded by analytics component 806-3) may be used to populate a database known as subscriber location database, that will ultimately be used by an emergency service provider to obtain exact location of UE 802, when UE 802 places an emergency call request. This will be further described below.

Environment 800 illustrates a non-emergency enabled EPC 808 and an emergency enabled EPC 810. Non-emergency enabled EPC 808 may be the same as edge EPC 312 of FIG. 3. For example, when UE 802 is registered with edge core router 806 as a "home" device where edge core router 806 and its corresponding edge EPC function as UE 802's "home" site component, then non-emergency enabled EPC 808 is the "home" edge EPC that is communicatively coupled with (and may even be in the same physical location) as edge core router 806. Non-emergency enabled EPC 808 and emergency enabled EPC 812 may be LTE EPCs or may alternatively be 5G EPCs.

In another example, when UE 802 is a visiting device connected to edge core router 806, the non-emergency enabled EPC can be UE 802's home edge EPC at another location that may be accessed via cloud EPC 324, as described above. Non-emergency enabled EPC 808, as described above, provides connectivity for UE 802 to its home enterprise network 810 that may be the same as enterprise network 313 (comprise of an enterprise LAN such as enterprise LAN 314, enterprise PBX 315, etc.).

Emergency enabled EPC 812 may be the same as cloud EPC 324 and IMS 814 may be the same as core IMS 325 described above with reference to FIGS. 3-6. Functioning together, emergency enabled EPC 812 and IMS 814, may route an emergency call request originating from UE 802 to emergency network 815. Emergency network 815 may be the same as ESR 704 of FIG. 7 and can include (Be communicatively coupled to) components such as GMLC 816, E-SMLC 818 and local PSAP 820. GMLC 816 may be the same GMLC 720 of FIG. 7, E-SMLC 818 may be the same as E-SMLC 718 of FIG. 7, and local PSAP 820 may be the same as PSAP terminal 724 of FIG. 7.

FIG. 8 also illustrates that environment 800 includes a private location engine 822. Private location engine 822 and the components thereof, may function to provide to PSAP terminal 820 as granular detail as available on the location of UE 802 from which the emergency call request is originated. In one example, a component such as GMLC 816 may directly interface with private location engine 822 or may request MME of emergency enabled EPC 812 to communicate with private location engine 822 to provide detailed location information of UE 802 within the physical area in which UE 802 is connected to edge core router 806 (e.g., identify as granular detail as available such as building, floor information, room number, etc., as described above).

Private location engine 822 has several components including cell location database 822-1, subscriber location database 822-2 and location delivery engine 822-3. Private location engine 822 may be implemented, maintained and operated as part of the private cellular network described in this disclosure.

Cell location database 822-1 can include information such as latitude and longitude of each access point such as access point 804 that is part of the private cellular network and/or any other access point that is either an access point of an MNO to which UE 802 can attach or an access point of another private cellular network provider. In addition to or instead of latitude and longitude information, cell location database 822-1 can include descriptive information (text) describing a location of each access point (e.g., street number, building name, floor name or number, room name or number, etc.). In some examples, cell location database 822-1 may be populated by edge core router 806 (e.g., when an access point such as access point 804 is attached to and registered with edge core router 806), through external cell database 824 that includes information gathered about location of access points such as access point manufacturer (or a party that installs the access point), through a Spectrum Allocation Server (SAS) database 826. In some examples, a platform enabling trade or exchange of wireless connectivity services among private cellular service providers and/or MNO providers may exist. This platform is trade platform 828 shown in FIG. 8. Trade platform 828 may be a distributed ledger system on which each private cellular provider or MNO (and/or alternatively each site component of a private cellular network) can have a node. Trade platform 828 can pull detailed information and frequency data on access point locations from sources such as external cell database 824 and/or SAS database 826, correlate the collected cell information (e.g., using cell location aggregator 828-1) and populate cell location database 822-1 with the cell information.

In some examples, the type of information stored in subscriber location database 822-2 is an association between an access point and a UE attached thereto. For example, when a voice or call data request comes in from UE 802 via access point 804, connection log generator 806-4 records the associated between UE 802 and access point 804. This association is stored in subscriber location database 822-2. Cell location database 822-1 can then be queried to retrieve information on the location of access point 804 (in as granular detail as available).

Location delivery engine 822-3 of private location engine 822 may be a programmatic interface to which API calls may be made either by GMLC 816, MME of emergency enabled EPC 812, etc. to query (or receive a push notification) for the location of UE 802 when an emergency call request is received from UE 802. Location delivery engine 822-3 may use information from cell location database 822-1 and subscriber location database 822-2 to obtain as granular detail as available on the location (e.g., latitude, longitude, description of location information, etc.) of the access point to which UE 802 is attached.

Accordingly, the configuration of FIG. 8 ensures that very specific location information of a UE connected to private cellular network of FIG. 8 be conveyed to an emergency service provider, allowing emergency help to reach a user of the UE as fast as possible.

Figure 9:
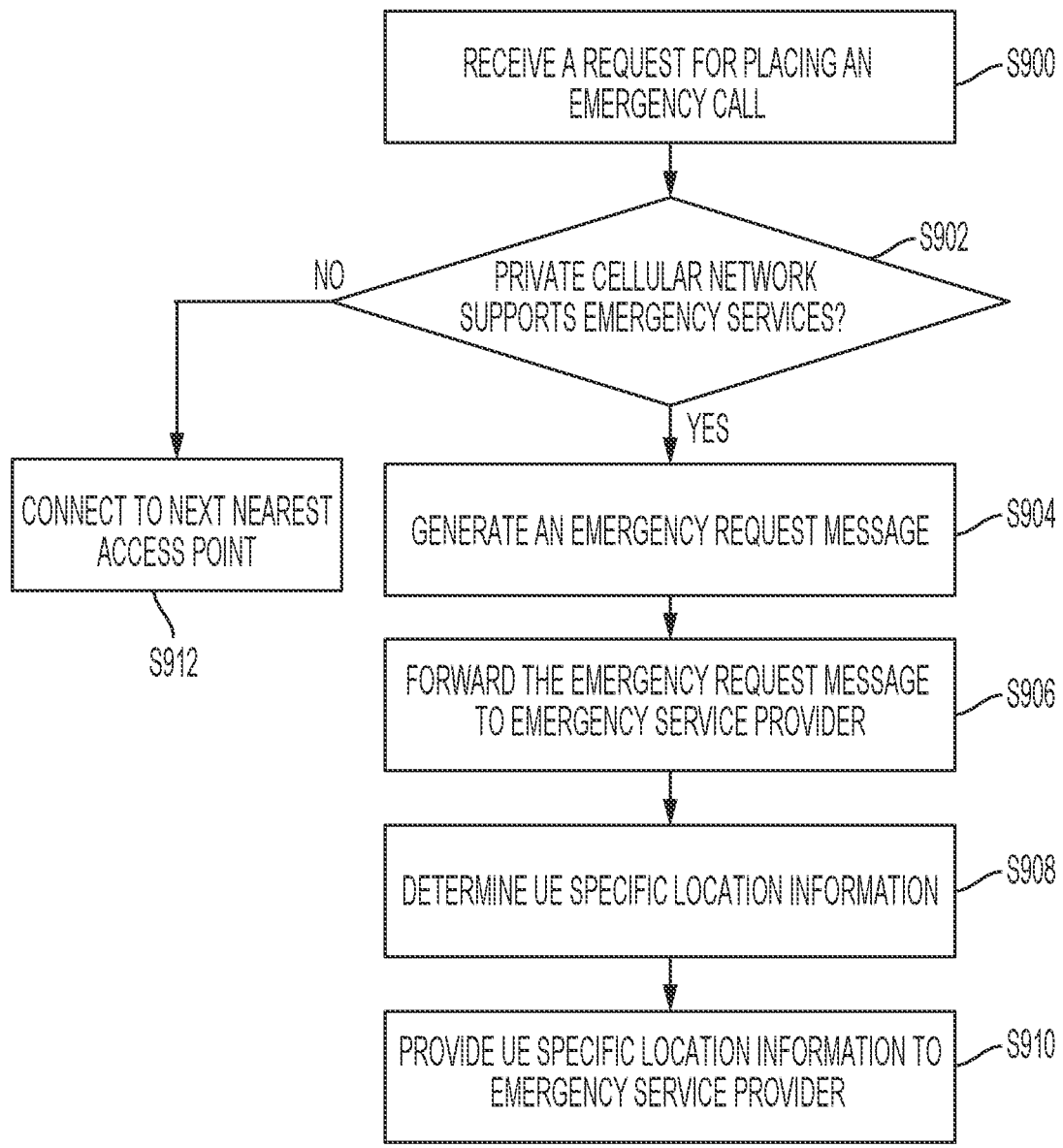
FIG. 9 illustrates a method of acquisition and exchange of location data with an emergency call center using a private cellular network, according to an aspect of the present disclosure.

FIG. 9 illustrates a method of acquisition and exchange of location data with an emergency call center using a private cellular network, according to an aspect of the present disclosure. FIG. 9 will be described with reference to FIG. 8 but may equally be applicable to and described with reference to FIG. 7.

At S900, edge core router 806 receives a request for placing an emergency call (e.g., a 911 call request). The emergency call may be placed by a user associated with UE 802 (e.g., by dialing 911 on UE 802). The request may be a VoLTE with an emergency bearer as described above.

At S902, edge core router 806 determines if the private cellular network and edge core router 806 can service emergency call requests. As described above, edge core router 806 determines if S1 links are configured to support emergency call services or not.

At S904 and after determining that emergency call services are supported, edge core router 806 generates an emergency request message to be forwarded to emergency service network 815 via emergency enabled EPC 812 and IMS 814, as described above. The format of the emergency request message can be compatible with any type of known or to be developed protocol to be used in communications between edge core router 710 and MME 712 (e.g., using S1 interface).

At S906, edge core router 806 sends the emergency request message to emergency service provider via emergency service network 815.

At S908, a specific location for UE 802 is determined. As described above, this determination may be based on an exchange of (communication of) information between private location engine 822 and the network element/component making the query (e.g., GMLC 816, MME of emergency enabled EPC 812, etc.). An example of such exchange includes a query of cell location database 822-1 and subscriber location database 822-2 of private location engine 822 by the network element/component, where, for example GMLC 816 or MME of emergency enabled EPC 812 send an API call to location delivery engine 822-3 of private location engine 822. In another example, the communication can be in the form of a push from location delivery engine 822-3 to the network element/component. This push can be in response to a request for UE specific location information from the network element/component.

The present disclosure provides a number of approaches for determining the specific location for a UE such as UE 802.

One approach is associating the UE with specific location information of the access point to which the UE is attached. As mentioned above, an access point such as access point 804 may be installed in a confined space such as a building, a particular floor of a building, particular room(s) on a given floor of a building, a warehouse, a commercial establishment such as a mall, a store, a grocery store, etc.

In one example, there may be multiple access points such as access point 804 of FIG. 8 installed throughout the geographical location in which private cellular network has coverage. Each such access point may have location information associated with it. Such location information can include, but is not limited to, a latitude/longitude information, a building identifier (e.g., among several buildings in a campus covered by private cellular network), a floor identifier in a building, a room number (room identifier) on a given floor in the building, an identifier of an area in a building or a warehouse (e.g., storage area in a warehouse, a delivery area in a warehouse, etc.).

Access point location information can be in the form of a numerical representation (e.g., Building 1, floor 2, room 504), latitude, longitude, and/or height above the ground of the location of access point 804 inside the geographical location, a description of the location information (e.g., Lincoln Tower, floor 5, Jefferson conference room), etc.

Descriptive information and/or geolocation information of access point 804 may be stored in cell location database 822-1. Geolocation information of access point 804 can include latitude and longitude as well as height above ground information of where the access point 804 is installed. Upon receiving a request for UE specific location (either a query or a request for a push, as described above), location delivery engine 822-3 identifies the corresponding UE for which the specific location information is requested (e.g., UE 802) and the access point to which it is connected by querying the subscriber location database 822-2. Once the access point to which the UE is identified (e.g., access point 804), cell location database 822-1 is queried to retrieve and correlate specific information on the location of the access point (e.g., access point 804) with the location of the UE (e.g., UE 802). This information can include latitude, longitude, height above ground, and/or descriptive information about the location access point 804 such as building name, building number, floor name, floor number, room name, room number, etc. That information will then be relayed in a message back to the requesting entity/component, which can be GMLC 816, MME of EPC 812, etc.

Another approach would be a triangulation approach. Int his example, access points installed throughout a building may have built-in triangulation functionalities. When a UE such as UE 802 attached to a nearby access point such as access point 804, two or more additional access points near UE 802 may emit and receive signals from UE 802 based on which signal strength of UE 802 relative to access point 804 and other nearby (e.g., two more) access points are measured. This approach can further refine the location of UE 802 to provide a more detailed description of UE 802's location. For example, while UE 802 may be connected to access point 806 installed in conference room #1 on the $8^{th}$ floor of building A, in reality UE 802 may be located in conference room #2. With two or more access points located nearby (e.g., one in a hallway connecting conference rooms #1 and #2 and another access point in another room adjacent to conference room #2, triangulation and signal strength measurement may be utilized to determine that UE 802 is located in conference room #2, on the $8^{th}$ floor of building A.

Another approach would be multiple beacons may be deployed throughout a confined location (e.g., a building) in which the private cellular network of the present disclosure is deployed (e.g., the location in which the site component of the private cellular network including access point 804, edge core router 806, and corresponding edge EPC are deployed). As UE 802 travels and moves around the location, UE 802 can receive signals from the nearby installed beacons and report those to edge core router 806. After receiving each (or every set number) of signals from UE 802, edge core router 806 can record a connection event log (similar to recording connection event log described above with reference to 806-4 of FIG. 8). This connection event log may then be stored in subscriber location database 822-2. This information may be used in conjunction with or in place of association between UE 802 and access point 806 to determine the specific location of the UE. In this example, cell location database 822-1 can include information on specific locations of the beacons just as it would include information on specific location of access points (e.g., latitude, longitude, height above ground, descriptive information of location of the beacons, etc.). As described above, cell location database 822-1 and subscriber location database 822-2 can be used in conjunction to determine the specific location of UE 802 based on reported beacon signals and beacon locations.

Another approach would be the deployed of low-cost receivers throughout the confined location in which the private cellular network of the present disclosure is deployed. The deployment of these low-cost receivers may be the same as the beacons described above. The low-cost receivers can continuously (or periodically) listen to signals emitted from a nearby UE and convey the same to a server (e.g., a server inside private location engine 822 or alternatively a server inside edge core router 806). The server, knowing the location of each installed low-cost receiver (e.g., latitude, longitude, height above ground, descriptive information of location of each receiver, etc.) can calculate the precise location of UE 802 and report that to emergency service providers when queried (or through a push when requested).

While a number of different approaches are described above for determine a specific location of a UE such as UE 802, the present disclosure is not limited thereto. Any other known or to be developed method that can provide details of the specific location of a UE within an area covered by a network may be utilized with such details including latitude, longitude, height above ground, descriptive information of the UE, etc.

Furthermore, each of the approaches outlined above may be used separately or in conjunction with other approaches. For example, a location of a UE may be determined using the specific location information of the access point, using triangulation, using installed beacons, and/or using low-cost receivers. The result from each utilized approach may be used to further refine and narrow the specific location of the UE. For example, one approach may result in only determining the building and the floor (e.g., building A, floor 8) on which the UE is located (e.g., using the location of the access point). Another approach (e.g., using triangulation) may reveal that the UE is located in a conference room (#22) on the 8th floor. A third approach (e.g., using beacons) can reveal that the UE is on the floor underneath a desk at the back of the conference room #22. Accordingly, the three approaches may be combined to identify for the requesting entity that the UE is on the floor behind a desk at the back of conference room #22 on the $8^{th}$ floor of building A. In another example, each approach may result in a slightly different determination of the exact location of a UE (e.g., different conference rooms, floors, etc.). Accordingly, the results of the different approaches may be combined to deduce as precise of a location of the subject UE (e.g., UE 802) as possible. In another approach, private location engine 822 may train and utilize a predictive model (e.g., a machine learning model) that can take various inputs (e.g., as broad as a country, state, city, zip code, etc.) to as detailed as building/floor/room names and numbers and output a specific location thus resolving any possible inconsistencies in the outcome of different approaches used for determining UE specific locations.

Once a specific location of a UE is determined (e.g., for UE 802) as described above with reference to S908, the process proceeds to S910, where the determined UE specific location information is provided to the requesting network element/component (e.g., GMLC 816, MME of EPC 812, etc.) so that relevant emergency service providers can provide appropriate emergency services to the precise location of UE 802 is as efficient and timely manner as possible.

Referring back to S902, if edge core router 806 determines that emergency services are not supported by the private cellular network and edge core router 806, at S912 a message is sent to UE 802 from edge core router 806 indicating the same (e.g., by setting flag emc_bs=1, as described with reference to FIG. 8), allowing UE 802 to find the nearest access point (which may not be an access point associated with the private cellular network) to route an emergency call request therethrough.

With various examples of traffic management and routing at a core router of a private enterprise network deployed at a site described above, the disclosure now turns to description of several example system components and architectures that can be utilized to function as any one or more components of ecosystems described above such as edge core router 308, metro core router 124, etc.

Figure 10A:
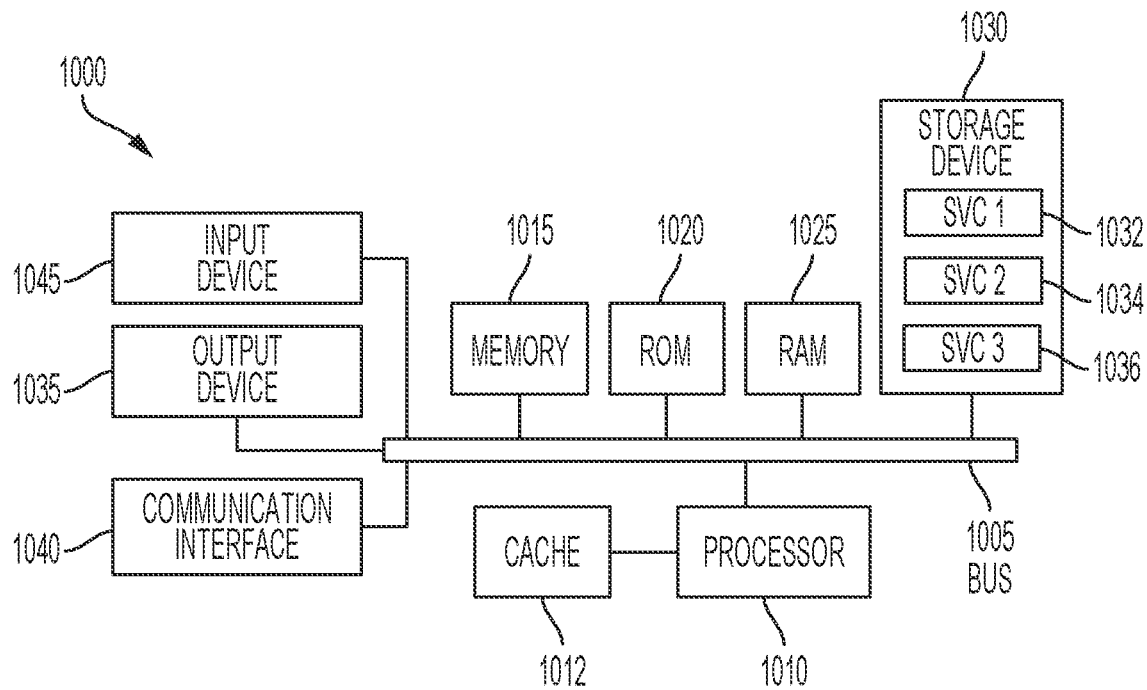
FIGS. 10A and 10B illustrate systems according to an aspect of the present disclosure.
Figure 10B:
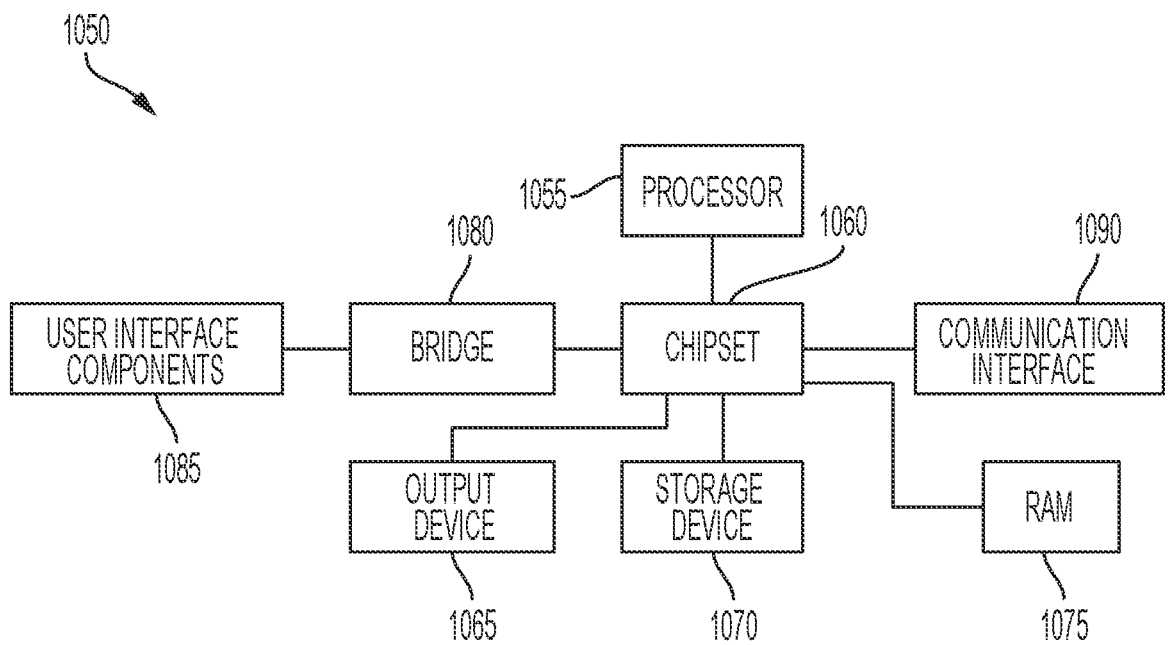

FIGS. 10A and 10B illustrate systems according to an aspect of the present disclosure. The more appropriate system will be apparent to those of ordinary skill in the art when practicing the various embodiments. Persons of ordinary skill in the art will also readily appreciate that other systems are possible.

FIG. 10A illustrates an example of a bus computing system 1000 wherein the components of the system are in electrical communication with each other using a bus 1005. The computing system 1000 can include a processing unit (CPU or processor) 1010 and a system bus 1005 that may couple various system components including the system memory 1015, such as read only memory (ROM) 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015, ROM 1020, RAM 1025, and/or storage device 630 to the cache 1012 for quick access by the processor 1010. In this way, the cache 1012 can provide a performance boost that avoids processor delays while waiting for data. These and other modules can control the processor 1010 to perform various actions. Other system memory 1015 may be available for use as well. The memory 1015 can include multiple different types of memory with different performance characteristics. The processor 1010 can include any general purpose processor and a hardware module or software module, such as services (SVC) 1 1032, SVC 2 1034, and SVC 3 1036 stored in the storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may easily be substituted for improved hardware or firmware arrangements as they are developed.

The storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1030 can include the software SVCs 1032, 1034, and 1036 for controlling the processor 1010. Other hardware or software modules are contemplated. The storage device 1030 can be connected to the system bus 1005. In some embodiments, a hardware module that performs a particular function can include a software component stored in a computer-readable medium in connection with the necessary hardware components, such as the processor 1010, bus 1005, output device 1035, and so forth, to carry out the function.

FIG. 10B illustrates an example architecture for a chipset computing system 1050 that can be used in accordance with an embodiment. The computing system 1050 can include a processor 1055, representative of any number of physically and/or logically distinct resources capable of executing software, firmware, and hardware configured to perform identified computations. The processor 1055 can communicate with a chipset 1060 that can control input to and output from the processor 1055. In this example, the chipset 1060 can output information to an output device 1065, such as a display, and can read and write information to storage device 1070, which can include magnetic media, solid state media, and other suitable storage media. The chipset 1060 can also read data from and write data to RAM 1075. A bridge 1080 for interfacing with a variety of user interface components 1085 can be provided for interfacing with the chipset 1060. The user interface components 1085 can include a keyboard, a microphone, touch detection and processing circuitry, a pointing device, such as a mouse, and so on. Inputs to the computing system 1050 can come from any of a variety of sources, machine generated and/or human generated.

The chipset 1060 can also interface with one or more communication interfaces 1090 that can have different physical interfaces. The communication interfaces 1090 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 1055 analyzing data stored in the storage device 1070 or the RAM 1075. Further, the computing system 1050 can receive inputs from a user via the user interface components 1085 and execute appropriate functions, such as browsing functions by interpreting these inputs using the processor 1055.

It will be appreciated that computing systems 1000 and 1050 can have more than one processor 1010 and 1055, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A private cellular network system comprising:
a location engine configured to store thereon one or more databases that include specific location information of one or more user equipment connected to the private cellular network via a corresponding access point associated with the private cellular network, wherein the databases include a first database and a second database, the first database including location information of each access point associated with the private cellular network, the second database including information on association between one or more access points of the private cellular network and one or more users connected to the one or more access points; and
at least one network element configured to:
receive a request for placing an emergency call from an endpoint communicatively coupled to the private cellular network;
determine endpoint specific location information for the endpoint by communicating with the location engine of the private cellular network, the endpoint specific location information identifying location of the endpoint within a confined space in which the private cellular network is deployed; and
send the endpoint specific location information of the endpoint to an emergency service provider, the emergency service provider identifying which response team to dispatch to a location of the endpoint based at least in part on the endpoint specific location information.

2. The private cellular network system of claim 1, wherein the endpoint specific location information corresponds to an access point of the private cellular network to which the endpoint is communicatively coupled.

3. The private cellular network system of claim 1, wherein the endpoint specific location information identifies at least one of a building, a floor of the building and a room number inside the building in which the endpoint is located.

4. The private cellular network system of claim 1, wherein the endpoint specific location information identifies a latitude, a longitude, and a height above ground of the location of the endpoint within the confined space.

5. The private cellular network system of claim 1 wherein the first database is populated at least in part using cell location data collected by a platform node associated with the private cellular network.

6. The private cellular network system of claim 5, wherein the cell location data are collected from at least one of an external cell database that includes information on location of access points and a spectrum allocation server (SAS) database.

7. The private cellular network system of claim 1 wherein the second database is populated every time an edge core router of the private cellular network records a connection log that identifies a UE in association with an access point.

8. The private cellular network system of claim 1, wherein the location engine is queries by one of a mobility management entity (MME) of an evolved packet core of the private cellular network or a component of an emergency network.

9. The private cellular network system of claim 1, wherein the location engine is queried via an application programming interface (API) call to a programmatic interface of the location engine.

10. A private cellular network system comprising:
a private cellular network communicatively coupled to an emergency service provider, the private cellular network having a location engine configured to store thereon one or more databases that include specific location information of one or more user equipment connected to the private cellular network via a corresponding access point associated with the private cellular network, the specific location information identifying a location of a corresponding user equipment within a confined space in which the private cellular network is deployed, the specific location information, when provided to an emergency service provider enables the emergency service provider to specifically locate the corresponding user equipment within the confined space and provide requested emergency response to a user of the corresponding user equipment, wherein the databases include a first database and a second database, the first database including location information of each access point associated with the private cellular network, the second database including information on association between one or more access points of the private cellular network and one or more users connected to the one or more access points; and at least one network element configured to:
determine endpoint specific location information for an endpoint from which an emergency call request is received, the endpoint specific location information being determined by communicating with the location engine of the private cellular network; and
send the endpoint specific location information of the endpoint to the emergency service provider.

11. The private cellular network system of claim 10, wherein the endpoint specific location information corresponds to an access point of the private cellular network to which the endpoint is communicatively coupled.

12. The private cellular network system of claim 10, wherein the endpoint specific location information identifies at least one of a building, a floor of the building and a room number inside the building in which the endpoint is located.

13. The private cellular network system of claim 10, wherein the endpoint specific location information identifies a latitude, a longitude, and a height above ground of the location of the endpoint within the confined space.

14. The private cellular network system of claim 10, wherein the first database is populated at least in part using cell location data collected by a platform node associated with the private cellular network.

15. The private cellular network system of claim 14, wherein the cell location data are collected from at least one of an external cell database that includes information on location of access points and a spectrum allocation server (SAS) database.

16. The private cellular network system of claim 10, wherein the second database is populated every time an edge core router of the private cellular network records a connection log that identifies a UE in association with an access point.

17. The private cellular network system of claim 10, wherein emergency call request is received at an edge core router of the private cellular network, and the at least one network element is one of a mobility management entity (MME) of an evolved packet core of the private cellular network or a component of an emergency network.

18. The private cellular network system of claim 10, wherein the location engine is queried via an application programming interface (API) call to a programmatic interface of the location engine.

19. A method for a private cellular network, the method comprising
storing in memory a location engine that includes one or more databases having specific location information of one or more user equipment connected to the private cellular network via a corresponding access point associated with the private cellular network, wherein the databases include a first database and a second database, the first database including location information of each access point associated with the private cellular network, the second database including information on association between one or more access points of the private cellular network and one or more users connected to the one or more access points;
receiving a request for placing an emergency call from an endpoint communicatively coupled to the private cellular network;
determining endpoint specific location information for the endpoint by communicating with the location engine of the private cellular network, the endpoint specific location information identifying location of the endpoint within a confined space in which the private cellular network is deployed; and
sending the endpoint specific location information of the endpoint to an emergency service provider, the emergency service provider identifying which response team to dispatch to a location of the endpoint based at least in part on the endpoint specific location information.

\* \* \* \* \*